United States Patent
Mizukami

(10) Patent No.: US 8,768,982 B2
(45) Date of Patent: Jul. 1, 2014

(54) INFORMATION PROCESSING APPARATUS, METHOD, AND PROGRAM

(75) Inventor: Kenichi Mizukami, Kanagawa (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 12/960,948

(22) Filed: Dec. 6, 2010

(65) Prior Publication Data

US 2011/0167046 A1     Jul. 7, 2011

(30) Foreign Application Priority Data

Jan. 6, 2010   (JP) ................................. 2010-000921

(51) Int. Cl.
*G06F 17/30*     (2006.01)

(52) U.S. Cl.
USPC ......................................... 707/822; 707/828

(58) Field of Classification Search
None
See application file for complete search history.

(56) References Cited

U.S. PATENT DOCUMENTS

| | | | | |
|---|---|---|---|---|
| 7,072,260 | B1 * | 7/2006 | Sako et al. | 369/53.21 |
| 2002/0191499 | A1 * | 12/2002 | Ando et al. | 369/30.03 |
| 2005/0041117 | A1 * | 2/2005 | Yamagishi | 348/231.2 |
| 2006/0047920 | A1 * | 3/2006 | Moore et al. | 711/154 |
| 2009/0204568 | A1 * | 8/2009 | Takayama et al. | 707/1 |

FOREIGN PATENT DOCUMENTS

JP         2008-22504       1/2008

* cited by examiner

*Primary Examiner* — Ajay Bhatia
*Assistant Examiner* — Miranda Huang
(74) *Attorney, Agent, or Firm* — Sony Corporation

(57) ABSTRACT

An information processing apparatus includes a discrimination unit that discriminates types of recording media recording contents, a search unit that searches for a predetermined folder determined by a standard of recording of the contents recorded on the recording media, a determination unit that determines whether a recording position of the predetermined folder searched for by the search unit meets a standard of the recording media, and a restoration unit that restores the predetermined folder when the determination unit determines that the recording position of the predetermined folder does not meet the standard of the recording media.

14 Claims, 24 Drawing Sheets

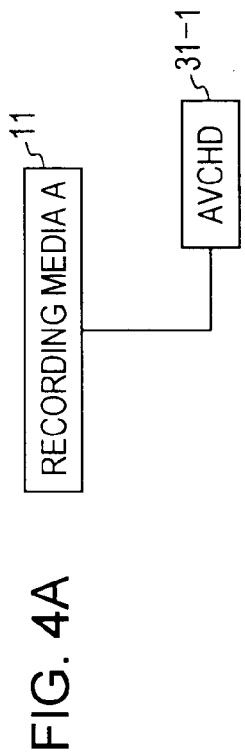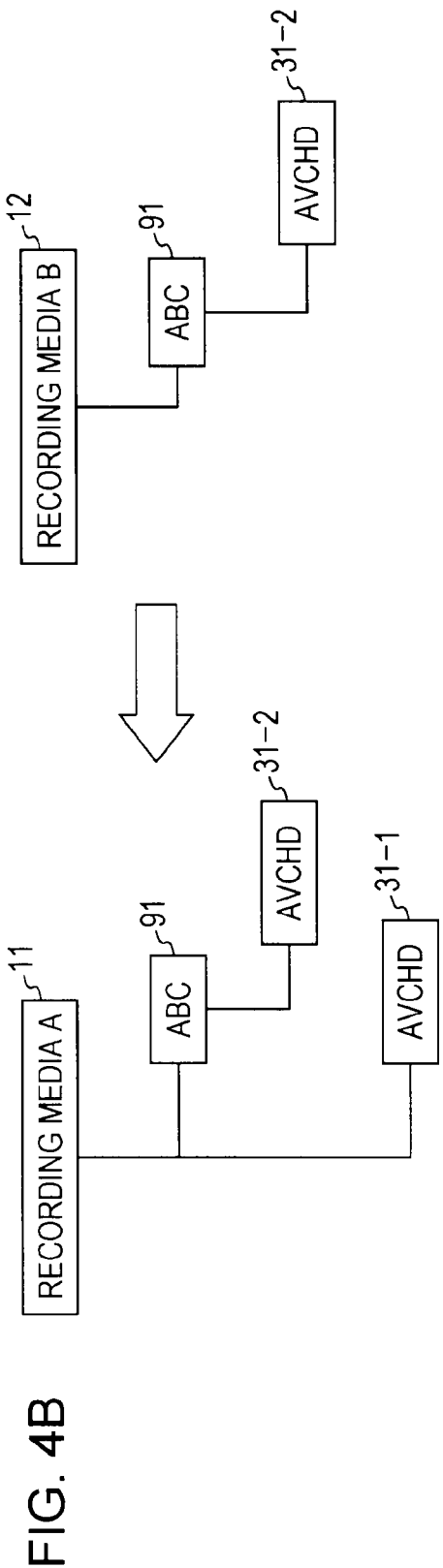
FIG. 4A
FIG. 4B

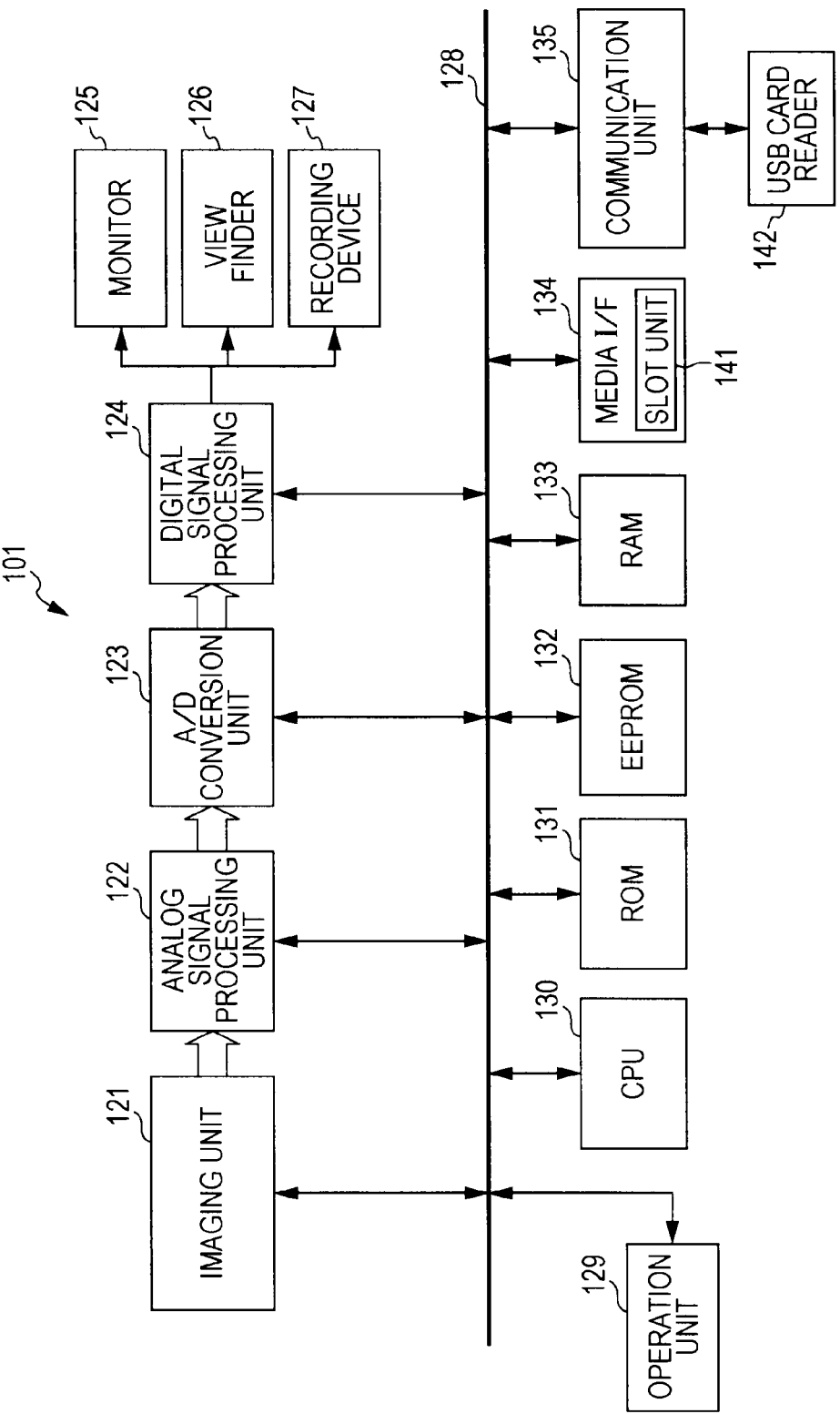

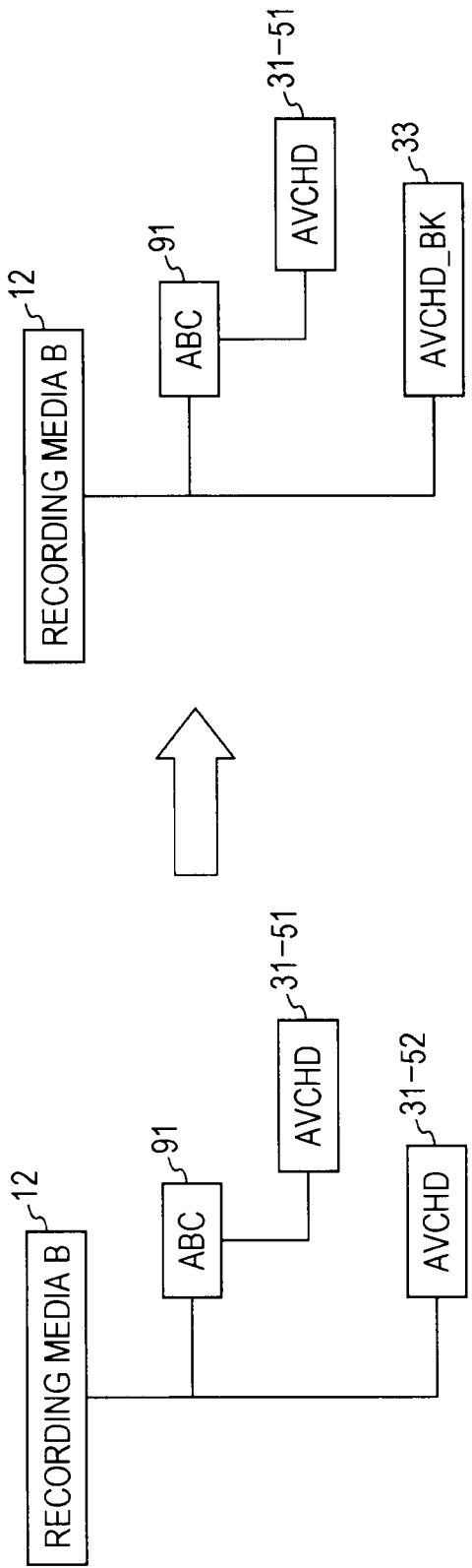

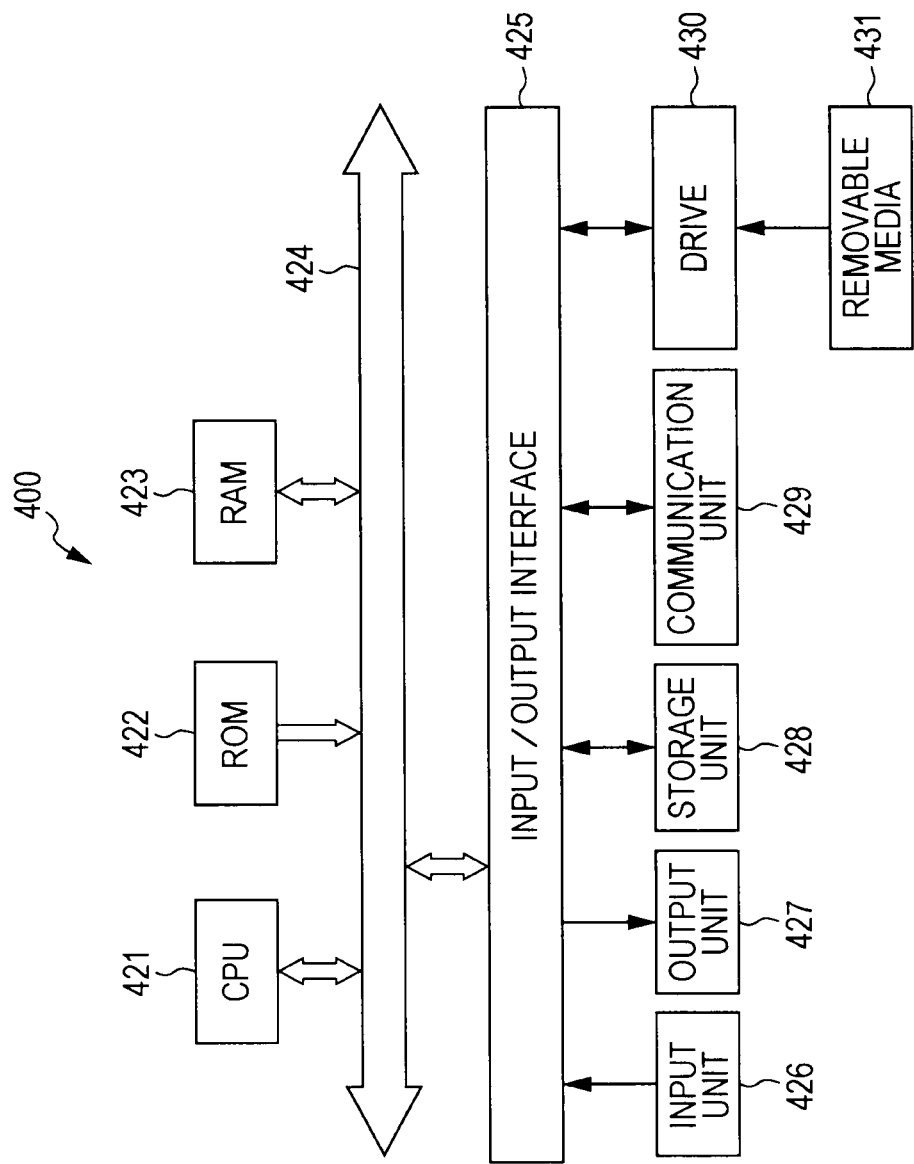

INFORMATION PROCESSING APPARATUS, METHOD, AND PROGRAM

BACKGROUND OF THE INVENTION

1. Field of the Invention

The present invention relates to an information processing apparatus, method, and a program, and more particularly to, an information processing apparatus, method, and a program, which can restore the configuration of a folder to meet the standard of recording media.

2. Description of the Related Art

The standard of recording media varies depending on recording media. The position of a folder of AVCHD (Advanced Video Codec High Definition), which is the standard for video camera moving picture recording, is also determined by the standard of recording media A11 as illustrated in FIGS. 1A and 1B.

FIG. 1A illustrates the folder configuration of the recording media A11. According to the standard of the recording media A11, an AVCHD folder 31 is located under the recording media A11 as a ROOT folder. The configuration of the AVCHD folder 31 is determined by the AVCHD standard.

That is, a BDMV folder 51 is recorded under the AVCHD folder 31, and a PLAYLIST folder 71, a CLIPINF folder 72 and a STREAM folder 73 are recorded under the BDMV folder 51.

The recording media A11, for example, is a memory stick (registered trademark of SONY Corporation). The folder configuration thereof is disclosed in Japanese Unexamined Patent Application Publication No 2008-22504.

FIG. 1B illustrates the folder configuration of another recording media B12. According to the standard of recording media B12, an ABC folder 91 is located under the recording media B12 as a ROOT folder and an AVCHD folder 31 is located under the ABC folder 91. In addition, since the name of folders located under the recording media B12 is determined according to the standard of recording media B12, the name of the folder is not limited to 'ABC'.

Similarly to the recording media A11, a BDMV folder 51 is recorded under the AVCHD folder 31, and a PLAYLIST folder 71, a CLIPINF folder 72 and a STREAM folder 73 are recorded under the BDMV folder 51.

The recording media B12, for example, is an SD card (trademark).

When the AVCHD folder 31 is recorded on the recording media, if the recording media is accurately recognized and a folder configuration according to the standard of the recording media is not employed, since standard violation occurs, data reading and writing may not be accurately performed with respect to the AVCHD folder 31 of the recording media.

Since many existing devices correspond to only one of the recording media A11 and the recording media B12, the devices have been designed with a folder configuration according the standard of the recording media.

However, in the case of developing devices corresponding to both the recording media A11 and the recording media B12, it is necessary to accurately recognize the types of the recording media and employ a folder configuration according to the recognized recording media.

However, for example, when recording media is connected to a device via a USB (Universal Serial Bus) card reader and the like, it is difficult to identify the types of the recording media.

If it is not possible to identify the types of the recording media, since the AVCHD folder 31 may not be recorded in the folder configuration according to the standard of the recording media, standard violation occurs. Such an example is illustrated in FIGS. 2, 3, 4A, 4B, 5A and 5B.

FIG. 2 illustrates an example in which a user copies data of the AVCHD folder 31 recorded on the recording media A11 into the recording media B12 for each folder through a personal computer (not shown).

In FIG. 2, the AVCHD folder 31 stored on the recording media A11 is recorded with a folder configuration according to the standard of the recording media A11. That is, the AVCHD folder 31 is formed under the ROOT folder.

However, when the data of the AVCHD folder 31 of the recording media A11 is copied into the recording media B12 for each folder, the AVCHD folder 31 recorded on the recording media B12 is located in a folder configuration not in the standard of the recording media B12. That is, the AVCHD folder 31 is not located under the ABC folder 91 but under the ROOT folder.

Therefore, the data of the AVCHD folder 31 recorded under the recording media B12 violates the standard of the recording media B12.

FIG. 3 illustrates an example in which data of the AVCHD folder 31 recorded on the recording media B12 is copied into the recording media A11 for each folder.

In FIG. 3, the AVCHD folder 31 stored on the recording media B12 is recorded with a folder configuration according to the standard of the recording media B12. That is, the AVCHD folder 31 is formed under the ABC folder 91.

However, when the data of the AVCHD folder 31 of the recording media B12 is copied into the recording media A11 for each folder, the AVCHD folder 31 recorded on the recording media A11 is located in a folder configuration not in the standard of the recording media A11. That is, the AVCHD folder 31 is not located under the ROOT folder but under the ABC folder 91.

Therefore, the data of the AVCHD folder 31 recorded under the recording media A11 violates the standard of the recording media A11.

Next, FIGS. 4A and 4B illustrate an example including an AVCHD folder 31-1 recorded with the folder configuration according to the standard of the recording media A11 and an AVCHD folder 31-2 recorded with a folder configuration not in the standard of the recording media A11.

FIG. 4A illustrates an example in which the AVCHD folder 31-1 is recorded under the ROOT folder of the recording media A11. That is, the AVCHD folder 31-1 is recorded with the folder configuration according to the standard of the recording media A11.

FIG. 4B illustrates an example in which the recording media A11 (shown in the left side of FIG. 4B) is obtained by copying data of the AVCHD folder 31-2 recorded on the recording media B12 (shown in the right side of FIG. 4B) into the recording media A11 illustrated in FIG. 4A for each folder.

That is, on the recording media A11 illustrated in FIG. 4B, the AVCHD folder 31-1 located under the ROOT folder according to the standard of the recording media A11, and the AVCHD folder 31-2 not meeting the standard of the recording media A11, that is, which is not located under the ROOT folder but under the ABC folder 91, are recorded.

It is necessary for the AVCHD folder 31 to be one folder. However, in the example of FIG. 4B, since the AVCHD folder 31-1 and the AVCHD folder 31-2 coexist, standard violation occurs, and reading and writing may not be accurately performed with respect to the data of the AVCHD folder 31-1 and the data of the AVCHD folder 31-2.

FIG. 5A illustrates an example in which the ABC folder 91 is located under the ROOT folder of the recording media B12 and an AVCHD folder 31-11 is recorded under the ABC folder 91. That is, the AVCHD folder 31-11 is recorded with the folder configuration according to the standard of the recording media B12.

FIG. 5B illustrates an example in which the recording media B12 (shown in the left side of FIG. 5B) is obtained by copying data of an AVCHD folder 31-12 recorded on the recording media A11 (shown in the right side of FIG. 5B) into the recording media B12 illustrated in FIG. 5A for each folder.

That is, on the recording media B12 illustrated in FIG. 5B, the AVCHD folder 31-11 located under the ABC folder 91 according to the standard of the recording media B12, and the AVCHD folder 31-12 not meeting the standard of the recording media B12, that is, which is not located under the ABC folder 91 but under the ROOT folder, are recorded.

In the example of FIG. 5B, since the AVCHD folder 31-11 and the AVCHD folder 31-12 coexist, standard violation occurs, and reading and writing may not be accurately performed with respect to the data of the AVCHD folder 31-11 and the data of the AVCHD folder 31-12.

It is desirable to restore the configuration of a folder to meet the standard of recording media.

SUMMARY OF THE INVENTION

According to an embodiment of the invention, there is provided an information processing apparatus, which includes: a discrimination unit that discriminates types of recording media recording contents; a search unit that searches for a predetermined folder determined by a standard of recording of the contents recorded on the recording media; a determination unit that determines whether a recording position of the predetermined folder searched for by the search unit meets a standard of the recording media; and a restoration unit that restores the predetermined folder when the determination unit determines that the recording position of the predetermined folder does not meet the standard of the recording media. Further, according to other embodiments of the invention, there are provided an information processing method and a program for allowing a computer to function as an information processing apparatus.

The restoration unit may shift the recording position of the predetermined folder in order to meet the standard of the recording media, or change a name of the predetermined folder, which is determined by the determination unit as not meeting the standard of the recording media, to a non-standardized name of the recording media.

The information processing apparatus further includes an analysis unit and a collation unit. The search unit may further search for a folder recording database information, the analysis unit may analyze information of the predetermined folder searched for by the search unit and the database information, the collation unit may collate a plurality of pieces of the information of the predetermined folder and the database information analyzed by the analysis unit, and the discrimination unit may discriminate the types of the recording media based on the predetermined folder having the information coinciding with the database information collated by the collation unit.

When it is not possible to discriminate the types of the recording media based on the database information, the determination unit may determine the recording position of the predetermined folder, and the discrimination unit may discriminate the types of the recording media based on the recording position of the predetermined folder determined by the determination unit.

When it is not possible to discriminate the types of the recording media based on the recording position of the predetermined folder, the search unit may further search for a unique identification file of the recording media, the determination unit may determine a recording position of the identification file, and the discrimination unit may discriminate the types of the recording media based on the recording position of the identification file determined by the determination unit.

The discrimination unit may discriminate the recording media as predetermined recording media when it is not possible to discriminate the types of the recording media.

In an embodiment of the present invention, when the types of recording media recording contents are discriminated, a predetermined folder determined by the standard of the recording of the contents recorded on the recording media is searched for, it is determined whether the recording position of the predetermined folder searched for meets the standard of the recording media, and it is determined that the recording position of the predetermined folder does not meet the standard of the recording media, the predetermined folder is restored.

According to an embodiment of the invention, the configuration of a folder can be restored according to the standard of recording media.

BRIEF DESCRIPTION OF THE DRAWINGS

FIGS. 4A and 4B are diagrams illustrating an example of standard violation of recording media.

FIG. 6 is a block diagram illustrating an example of the configuration of a digital video camera.

FIG. 26 is a diagram illustrating an example of a restoration process.

FIG. 27 is a block diagram illustrating an example of the configuration of hardware of a computer to which the present invention is applied.

DESCRIPTION OF THE PREFERRED EMBODIMENTS

Configuration of Digital Video Camera

Figure 1A:
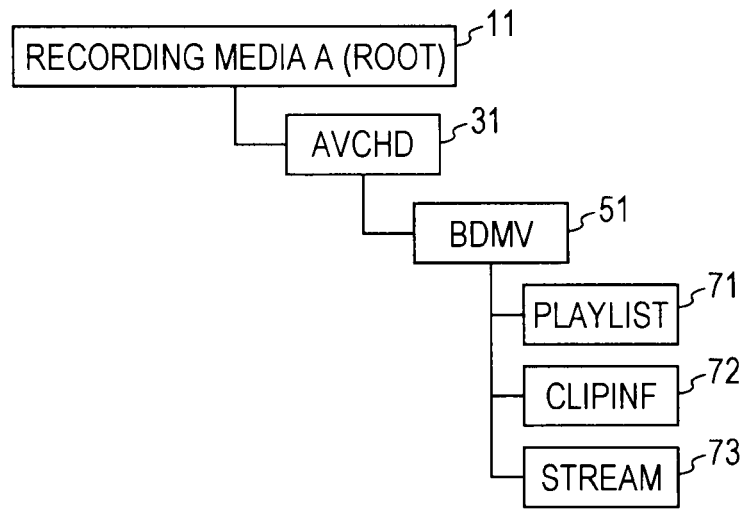
FIGS. 1A and 1B are diagrams illustrating the outline of a folder configuration of two different types of recording media.
Figure 1B:
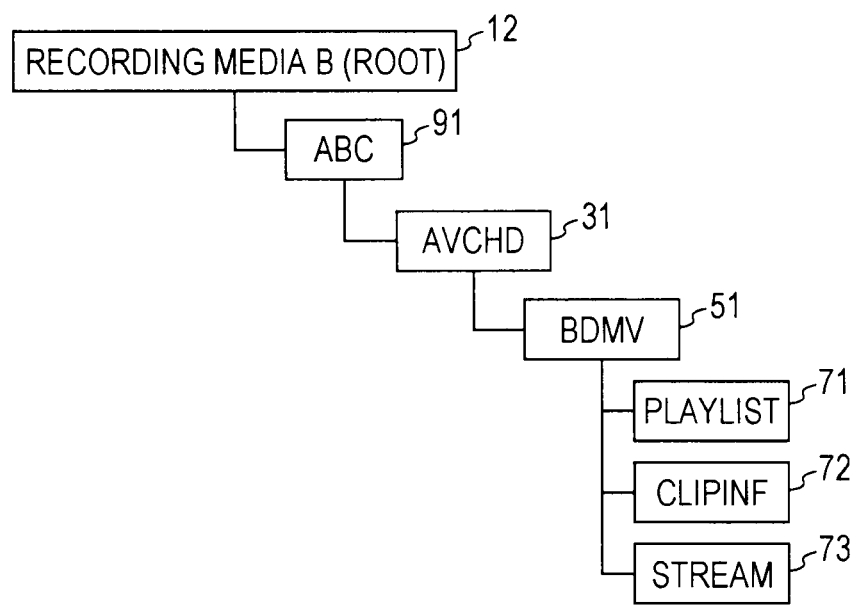
Figure 2:
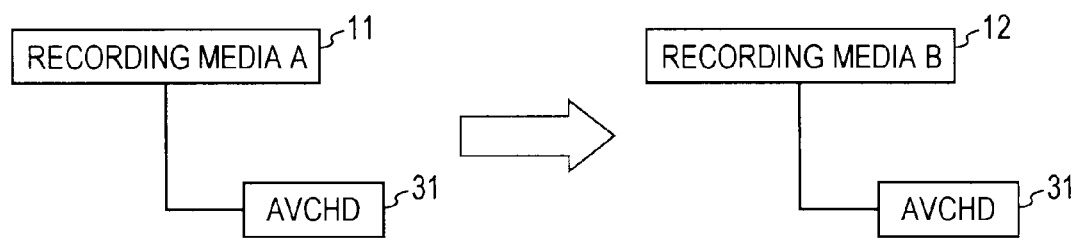
FIG. 2 is a diagram illustrating an example of standard violation of recording media.
Figure 3:
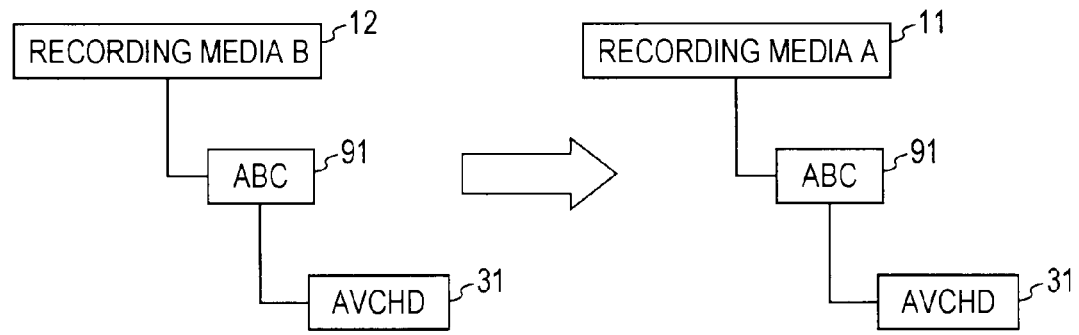
FIG. 3 is a diagram illustrating an example of standard violation of recording media.

FIG. 6 is a block diagram illustrating an example of the configuration of a digital video camera 101 to which an embodiment of the present invention is applied.

In the example of FIG. 6, the digital video camera 101 as an information processing apparatus includes an imaging unit 121, an analog signal processing unit 122, an A/D conversion unit 123, a digital signal processing unit 124, a monitor 125, a view finder 126, a recording device 127, a bus 128, an operation unit 129, a CPU (Central Processing Unit) 130, a ROM (Read Only Memory) 131, an EEPROM (Electrically Erasable programmable ROM) 132, a RAM (Random Access Memory) 133, a media I/F (interface) 134, and a communication unit 135.

The imaging unit 121 images a subject. The imaging unit 121, for example, includes a CCD (Charge Coupled Device) image sensor, a CMOS (Complementary Metal Oxide Semiconductor) image sensor and the like.

The analog signal processing unit 122 generates an analog video signal of a still image or a moving image of the imaged subject, and supplies the analog video signal to the A/D conversion unit 123.

The A/D conversion unit 123 converts the analog video signal acquired from the analog signal processing unit 122 into a digital video signal, and supplies the digital video signal to the digital signal processing unit 124.

The digital signal processing unit 124 processes the digital video signal acquired from the A/D conversion unit 123, and supplies the processed signal to the monitor 125, the view finder 126 and the recording device 127.

The monitor 125 displays an image corresponding to the digital video signal acquired from the digital signal processing unit 124. The monitor 125, for example, includes a liquid crystal display and the like.

The view finder 126 displays the image corresponding to the digital video signal acquired from the digital signal processing unit 124. The view finder 126, for example, includes an EVF (Electronic View Finder) and the like.

The recording device 127 is embedded in the digital video camera 101 and records the digital video signal acquired from the digital signal processing unit 124.

The bus 128 allows the imaging unit 121, the analog signal processing unit 122, the A/D conversion unit 123, the digital signal processing unit 124, the operation unit 129, the CPU 130, the ROM 131, the EEPROM 132, the RAM 133, the media I/F 134 and the communication unit 135 of the digital video camera 101 to be connected to one another.

The operation unit 129 receives input from a user. The operation unit 129, for example, includes a button, a switch, a touch panel display and the like.

The CPU 130 controls the operation of the digital video camera 101. The function of the CPU 130 will be described in detail with reference to FIG. 8 later.

The ROM 131 records various processing programs and data necessary for processes which are executed in the digital video camera 101.

The EEPROM 132 is a non-volatile memory and records information, which is necessary to be stored even after power off, such as settings of the digital video camera 101 from a user.

The RAM 133 is used as a work area of various processes in order to temporarily record and store data acquired through various processes.

The media I/F 134 allows a removable disk such as recording media to be connected to a personal computer. The media I/F 134 has slots 141 for recording media A11 and recording media B12, and the recording media A11 and the recording media B12 are connected to the slots 141, respectively.

The communication unit 135 performs data exchange with respect to other digital video cameras, mobile terminal apparatuses, personal computers and the like through a communication path such as infrared communication, Bluetooth or cable.

Furthermore, the communication unit 135, for example, is connected to a USB card reader 142 through a USB cable. The recording media A11 or the recording media B12 is connected to the USB card reader 142.

Figure 7:
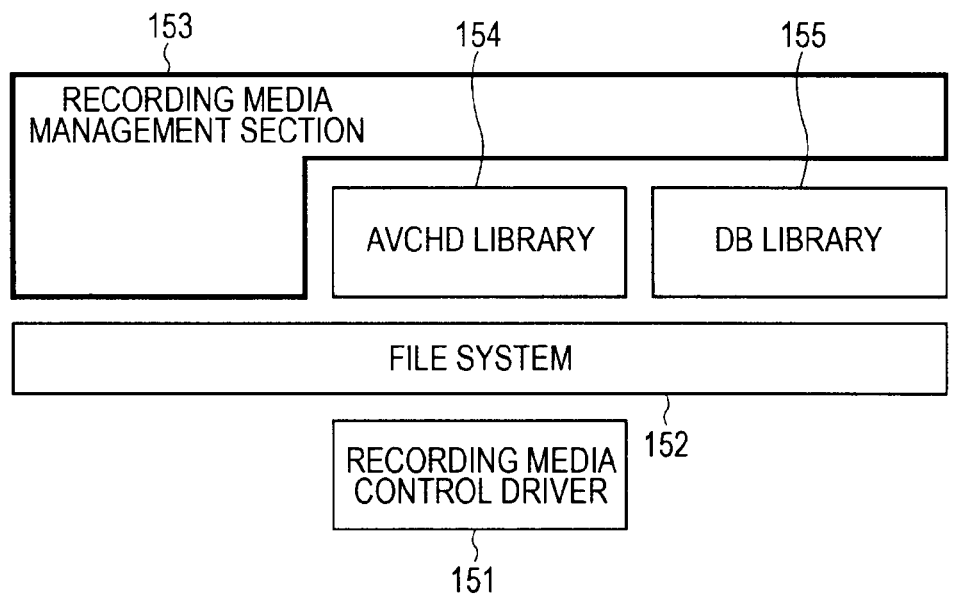
FIG. 7 is a diagram illustrating an example of the configuration of software associated with the control of a digital video camera.

FIG. 7 is a diagram illustrating an example of the configuration of software associated with the control of the digital video camera 101. The software is executed by the CPU 130.

In the example of FIG. 7, the software includes a recording media control driver 151, a file system 152, a recording media management section 153, an AVCHD library 154, and a DB (database) library 155.

The recording media control driver 151 is software for driving recording media and the like which are connected to the slot 141 or the USB card reader 142.

The file system 152 manages files recorded on the recording device 127 and a memory such as the ROM 131, the EEPROM 132 or the RAM 133.

The recording media management section 153 manages recording media connected through the slot 141 or the USB card reader 142.

The AVCHD library 154 manages the AVCHD folder 31 among data recorded on recording media.

The DB library 155 manages a database.

Figure 8:
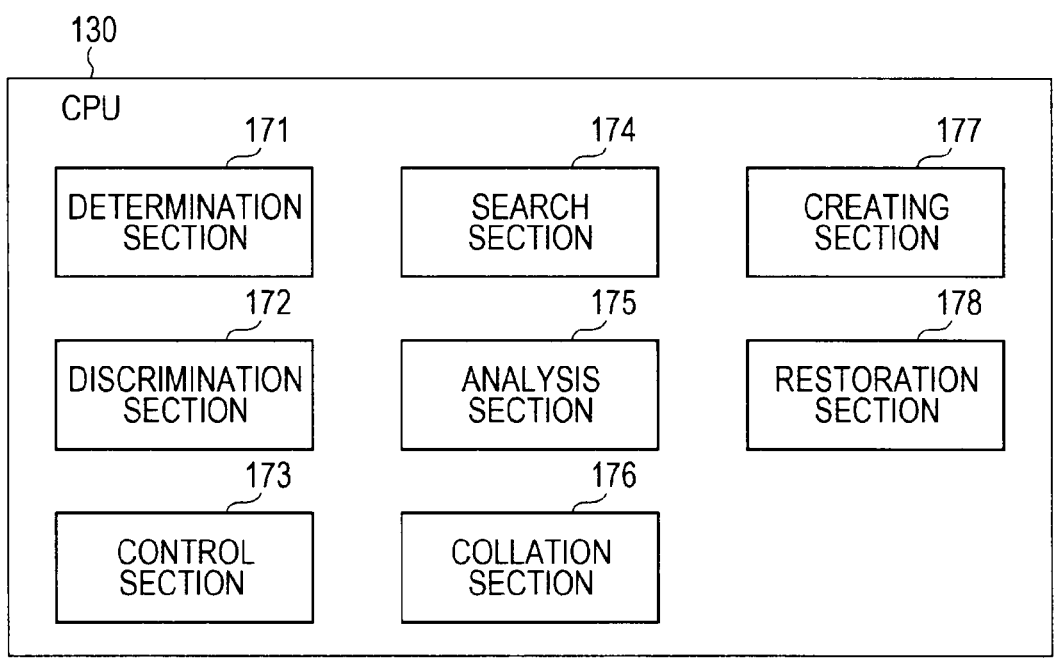
FIG. 8 is a block diagram illustrating an example of the functional configuration of a CPU.

FIG. 8 is a block diagram illustrating an example of the functional configuration of the CPU 130.

The CPU 130 includes a determination section 171, a discrimination section 172, a control section 173, a search section 174, an analysis section 175, a collation section 176, a creating section 177 and a restoration section 178. In addition, each block of the CPU 130 can exchange signals (data), if necessary.

The determination section 171 as a determination unit of the CPU 130 determines whether a process satisfies predetermined conditions. The discrimination section 172 as a discrimination unit discriminates the types of recording media. The control section 173 performs the control of the software illustrated in FIG. 7 and exchange of a recording media identification command. The search section 174 as a search unit searches for folders of recording media. The analysis section as an analysis unit analyzes the data and database of folders. The collation section 176 as a collation unit collates the analyzed data and database of the folders. The creating section 177 creates an AVCHD folder 31 according to the standard of recording media. The restoration section 178 as a restoration unit performs a process of restoring recording media.

Folder Restoration Process

When standard violation of recording media occurs, a restoration process according to the standard of the recording media will be described with reference to FIG. 9.

Figure 9:
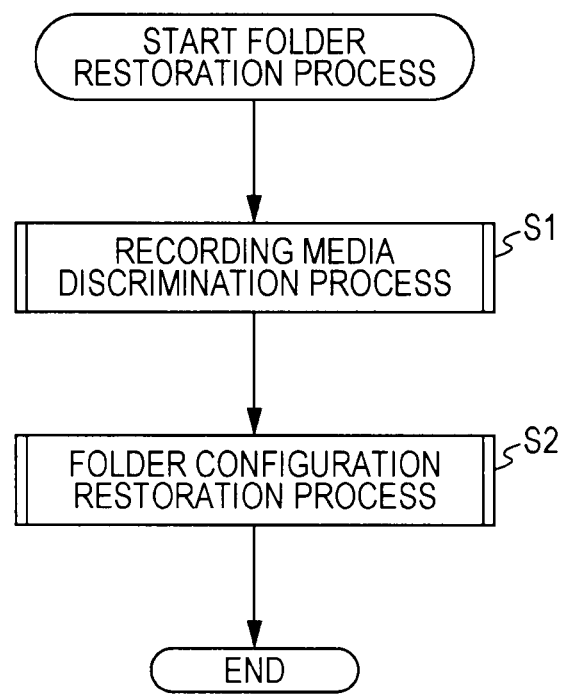
FIG. 9 is a flowchart explaining a folder restoration process.

FIG. 9 is a flowchart explaining a folder restoration process of restoring a folder according to the standard of the recording media. The folder restoration process is performed when the recording media is connected to the digital video camera 101.

In step S1, a recording media discrimination process is performed. Through the recording media discrimination process, recording media having recorded the AVCHD folder 31, which is a folder determined by the standard of the recording of contents, is discriminated. The recording media discrimination process in step S1 will be described in detail with reference to FIGS. 10, 11, 12, 13A, 13B, 14, 15, 16A, 16B, 17A, 17B, 18, 19A, 19B and 20.

In step S2, a folder configuration restoration process is performed. Through the folder configuration restoration process, the AVCHD folder 31, which violates the standard of recording media, is restored according to the standard. The folder configuration restoration process will be described in detail with reference to FIGS. 21, 22A, 22B, 23, 24, 25 and 26.

Recording Media Discrimination Process

Figure 10:
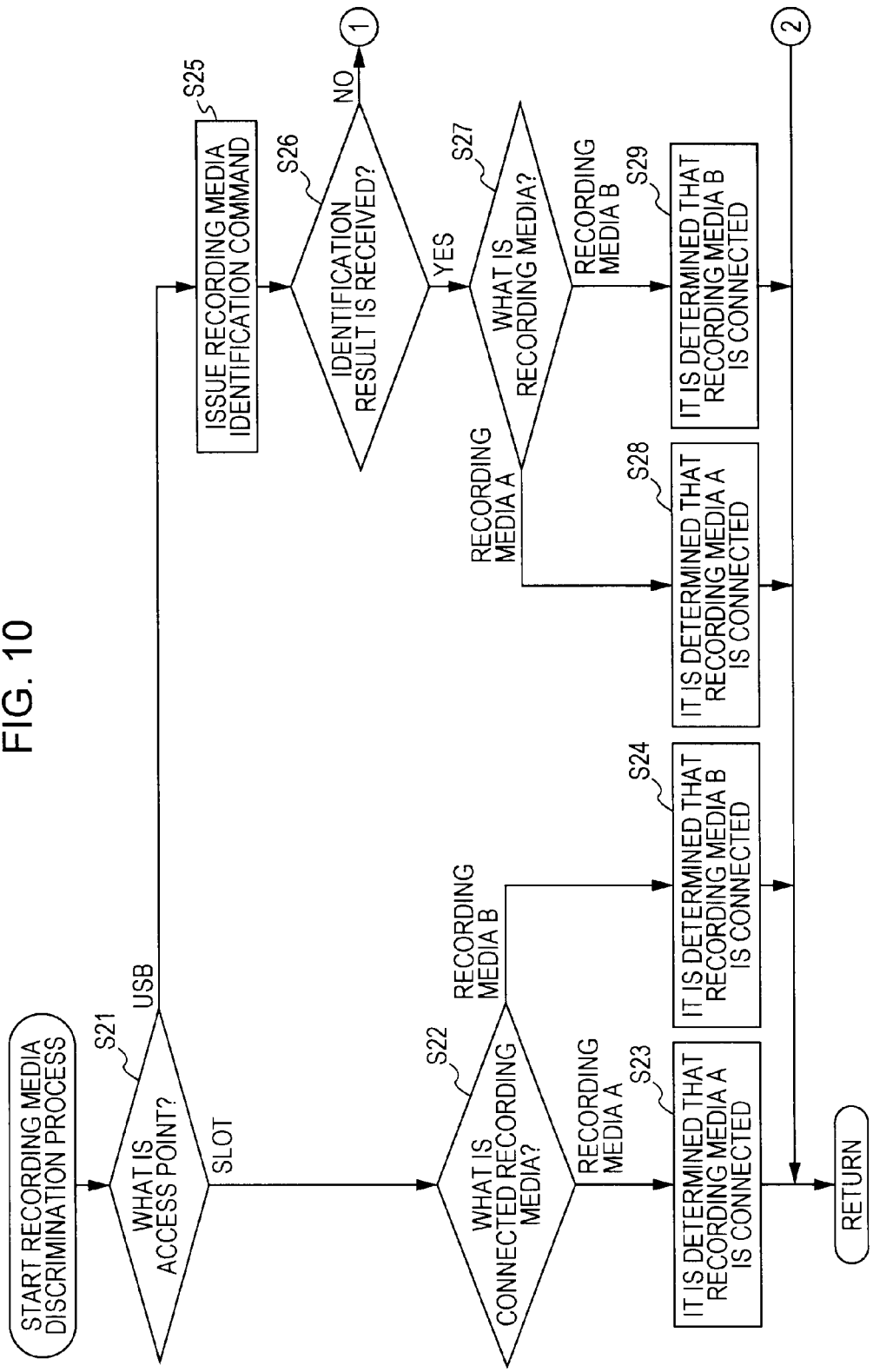
FIG. 10 is a flowchart explaining a recording media discrimination process.
Figure 11:
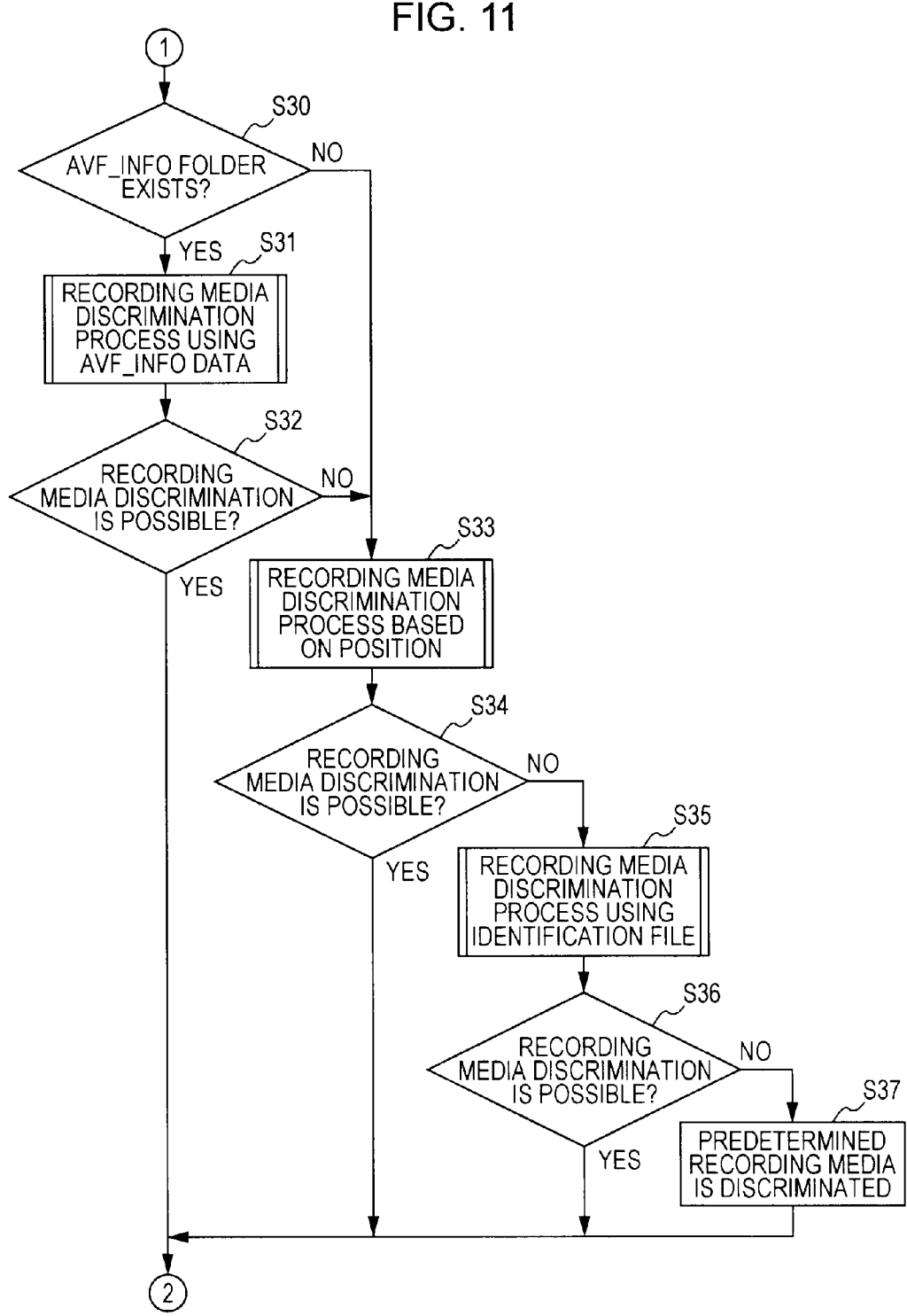
FIG. 11 is a flowchart explaining a recording media discrimination process.

FIGS. 10 and 11 are flowcharts explaining in detail the recording media discrimination process in step S1 of FIG. 9.

In step S21, the determination section 171 determines an access point of recording media. The access point of the recording media, for example, includes the dedicated slot 141 prepared for each recording media, the USB card reader 142 through which a plurality of recording media connected through a USB cable is readable, and the like.

In this example, an access point when recording media can be independently determined is employed as the slot 141 and an access point when recording media is not independently determined is employed as the USB card reader 142.

In addition, the access point when recording media can be independently determined and the access point when recording media is not independently determined are not limited to the above example.

In step S21, when it is determined that recording media for recording contents is connected to the slot 141, the determination section 171 determines the types of the connected recording media in step S22.

The slot 141 is dedicated for the respective recording media A11 and recording media B12. Thus, it is possible to determine whether the connected recording media is the recording media A11 or recording media B12.

In step S22, when it is determined that the connected slot 141 is for the recording media A11, the discrimination section 172 discriminates that the connected recording media is the recording media A11 in step S23.

In step S22, when it is determined that the connected slot 141 is for the recording media B12, the discrimination section 172 discriminates that the connected recording media is the recording media B12 in step S24.

Meanwhile, in step S21, when it is determined that recording media is connected to the USB card reader, in step S25, the control section 173 issues a recording media identification command as a special USB command and transmits the recording media identification command to the USB card reader 142.

Recording Media Identification Process Based on Special USB Command

If the recording media identification command is received, the USB card reader 142 performs a process of identifying recording media.

Figure 12:
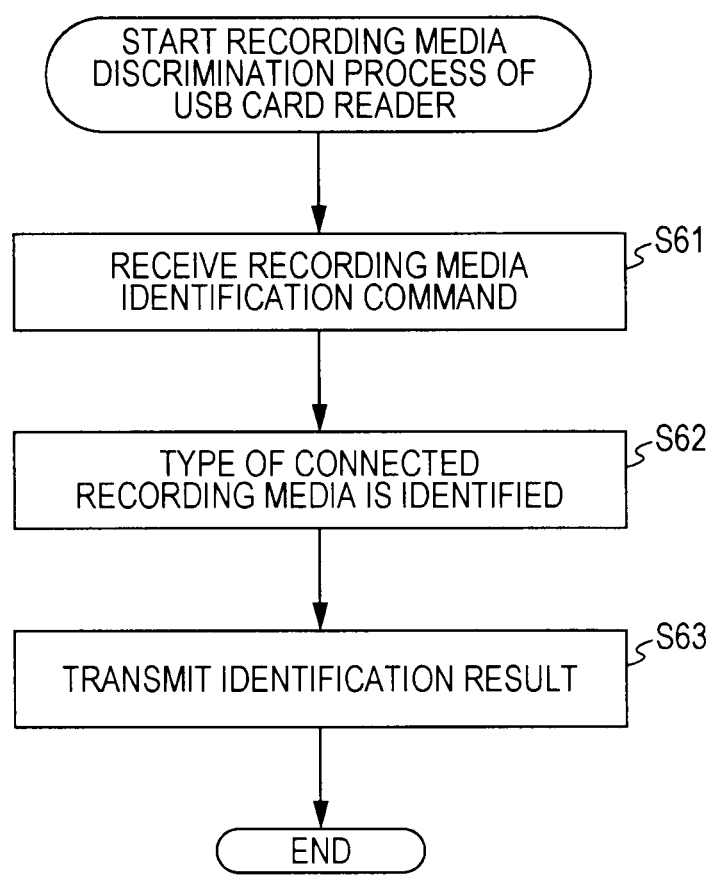
FIG. 12 is a flowchart explaining a recording media discrimination process of a USB card reader.

FIG. 12 is a flowchart explaining the recording media identification process of the USB card reader 142. The recording media identification process is performed when the USB card reader 142 can exchange a special USB command.

The USB card reader 142 includes a communication unit (not shown) for exchanging the special USB command and an identification unit (not shown) for identifying the types of recording media.

In step S61, the communication unit of the USB card reader 142 receives the recording media identification command which is transmitted from the digital video camera 101 in step S25 of FIG. 10.

In step S62, the identification unit of the USB card reader 142 identifies the types of the recording media connected to the USB card reader 142.

In step S63, the communication unit of the USB card reader 142 transmits the identification result of the recording media identified in step S62 to the digital video camera 101.

In this way, the recording media identification process of the USB card reader 142 is completed.

In addition, the exchange of the special USB command can be performed between a personal computer and the digital video camera 101.

When the special USB command is exchanged between the personal computer and the digital video camera 101, the digital video camera 101 discriminates connected recording media and transmits the discrimination result to the personal computer.

Returning to FIG. 10, in step S26, the determination section 171 determines whether the identification result is received from the USB card reader 142.

When it is determined that the identification result is received from the USB card reader 142 in step S26, the determination section 171 determines the types of the recording media connected to the USB card reader 142 in step S27.

When it is determined that the connected recording media is the recording media A11 in step S27, the discrimination section 172 discriminates that the connected recording media is the recording media A11 in step S28.

When it is determined that the connected recording media is the recording media B12 in step S27, the discrimination section 172 discriminates that the connected recording media is the recording media B12 in step S29.

When it is determined that the identification result is not received from the USB card reader 142 in step S26, that is, when the USB card reader 142 does not have a function of exchanging the special USB command, the process proceeds to step S30 of FIG. 11.

In step S30, the determination section 171 determines whether an AVF_INFO folder 32 exists in the recording media. The AVF_INFO folder 32 refers to a folder on which database information for managing information regarding titles of data of the AVCHD folder 31 and contents such as the number of contents in each title is recorded. The AVF_INFO folder 32 may not necessarily be provided according to the AVCHD standard, but can be provided.

Figure 13A:
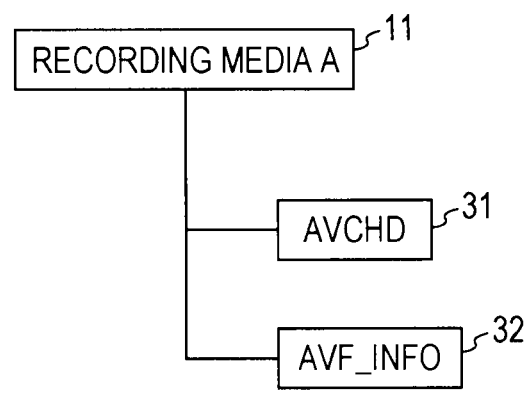
FIGS. 13A and 13B are diagrams illustrating the outline of an AVF_INFO folder.
Figure 13B:
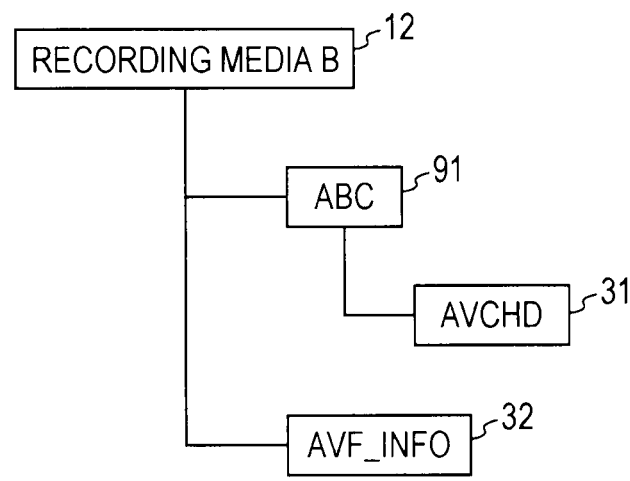

FIGS. 13A and 13B illustrate an example of the configuration of the AVF_INFO folder 32 recorded on the recording media.

FIG. 13A illustrates an example in which the AVF_INFO folder 32 is recorded on the recording media A11 and FIG. 13B illustrates an example in which the AVF_INFO folder 32 is recorded on the recording media B12.

As illustrated in FIGS. 13A and 13B, the AVF_INFO folder 32 is recorded under the ROOT folder, that is, the recording media A11 and the recording media B12, regardless of recording media.

In addition, a database of the AVF_INFO folder 32 is independent of the data of the AVCHD folder 31.

Figures 5A, 5B:
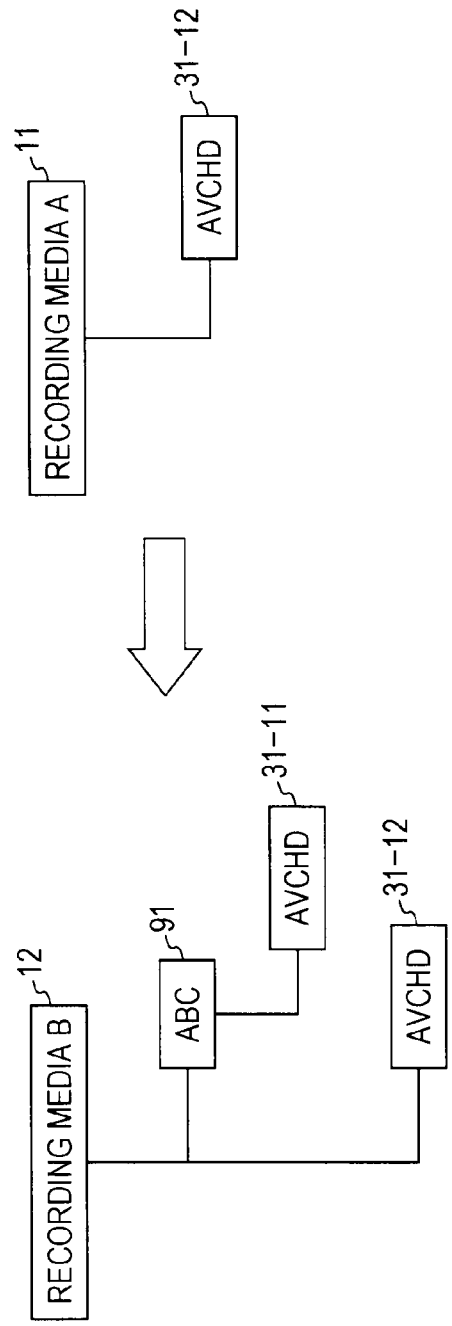
FIGS. 5A and 5B are diagrams illustrating an example of standard violation of recording media.

For example, in FIG. 5B, in the case where the AVF_INFO folder 32 exists under the ROOT folder of the recording media B12, the database of the AVF_INFO folder 32 is updated both when the content of the AVCHD folder 31-11 is updated and the content of the AVCHD folder 31-12 is updated.

Furthermore, the database of the AVF_INFO folder 32 can manage a moving image and a still image out of the AVCHD folder 31, in addition to the data of the AVCHD folder 31.

Returning to FIG. 11, when it is determined that the AVF_INFO folder 32 exists in step S30, a recording media discrimination process using AVF_INFO data is performed in step S31. The AVF_INFO data refers to the database of the AVF_INFO folder 32.

That is, the recording media is discriminated by collating the data of the AVCHD folder 31 and the database of the AVF_INFO folder 32. The recording media discrimination process using the AVF_INFO data will be described with reference to FIGS. 14, 15, 16A, 16B, 17A, 17B and 18.

Recording Media Discrimination Process Using Database

Figure 14:
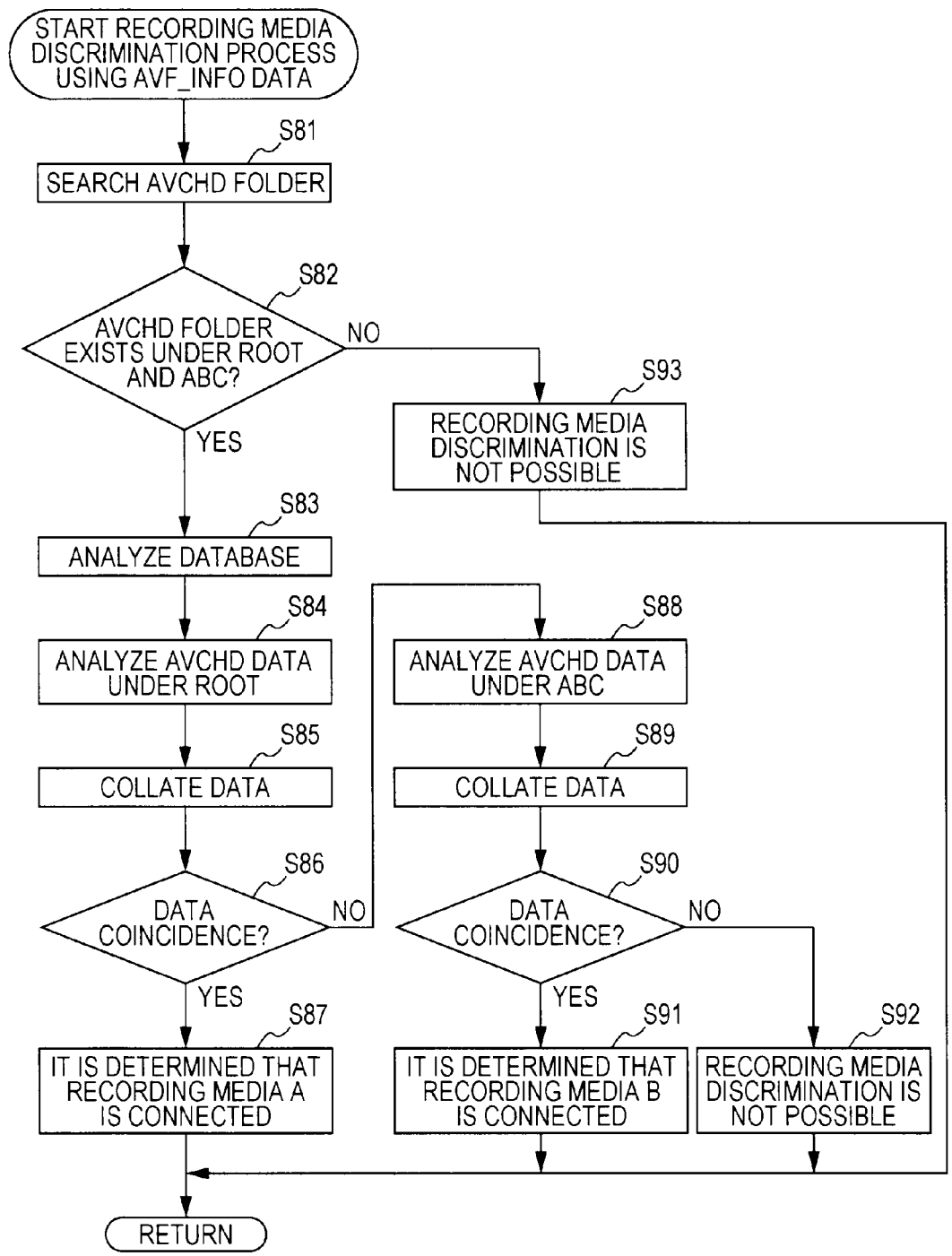
FIG. 14 is a flowchart explaining a recording media discrimination process using AVF_INFO data.

FIG. 14 is a flowchart explaining in detail the recording media discrimination process using the AVF_INFO data.

In step S81, the search section 174 searches for the AVCHD folder 31 of the recording media. That is, a folder under which the AVCHD folder 31 is recorded, is searched for.

In step S82, the determination section 171 determines whether the AVCHD folder 31 searched for in step S81 exists under the ROOT folder and the ABC folder 91. That is, the determination section 171 determines whether the AVCHD folder 31 is recorded under both the ROOT folder and the ABC folder 91, as with the folder configuration illustrated in FIGS. 4B and 5B.

When it is determined that the AVCHD folder 31 exists under both the ROOT folder and the ABC folder 91 in step S82, the analysis section 175 analyzes the database of the AVF_INFO folder 32 in step S83.

In detail, the number of titles, which are managed by the database of the AVF_INFO folder 32, and the number of contents in each title are acquired.

In step S84, the analysis section 175 analyzes the data of the AVCHD folder 31 recorded under the ROOT folder. In detail, the number of titles of the data of the AVCHD folder 31 recorded under the ROOT folder, and the number of contents in each title are acquired. That is, analysis similar to that in step S83 is performed.

In step S85, the collation section 176 collates the analysis result of the AVF_INFO data analyzed in step S83 and the analysis result of the data of the AVCHD folder 31 recorded under the ROOT folder, which has been analyzed in step S84.

Figure 15:
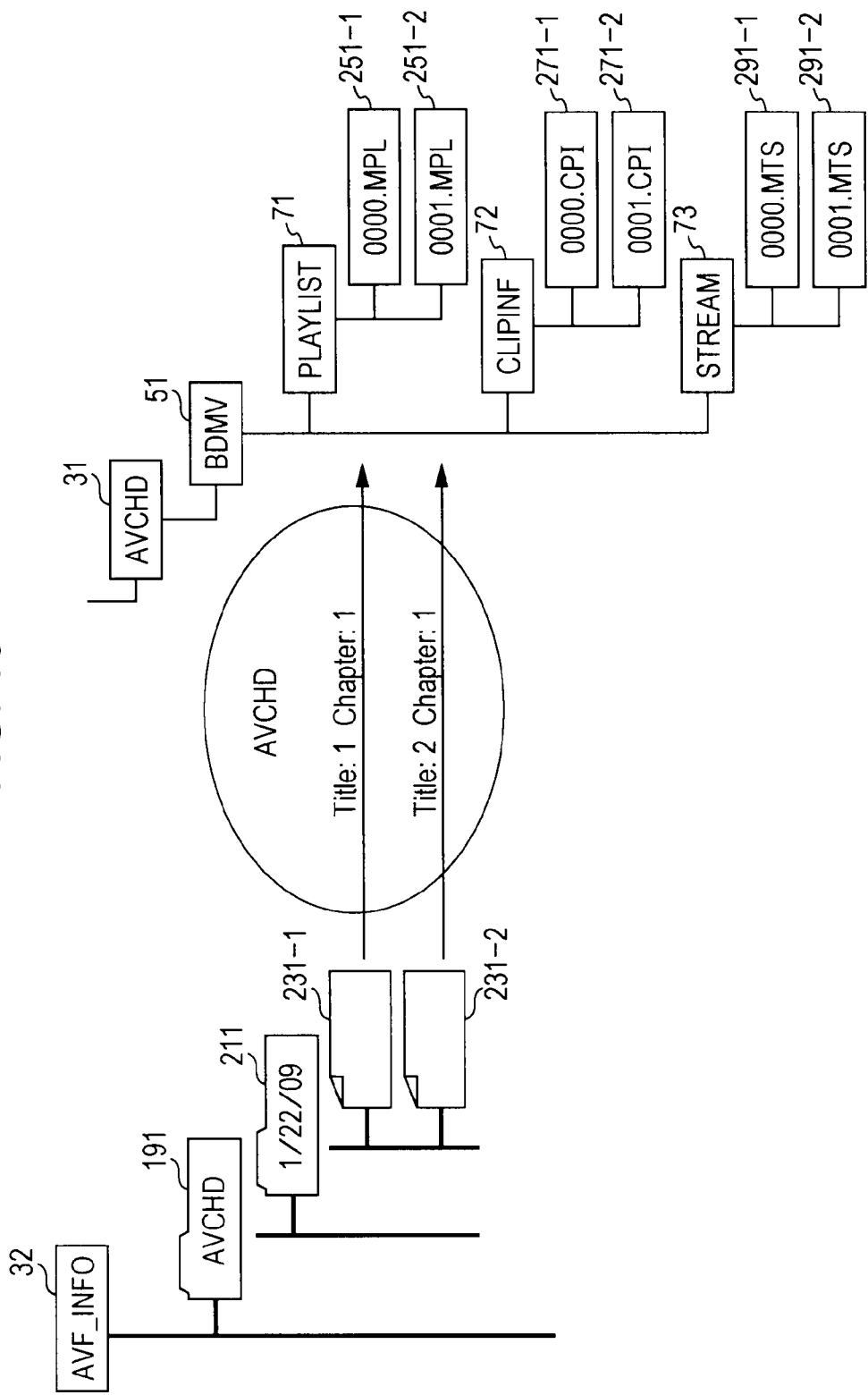
FIG. 15 is a diagram illustrating an example in which AVF_INFO data and AVCHD data are collated.

FIG. 15 illustrates an example of collating the analysis result of the AVF_INFO data and the analysis result of the data of the AVCHD folder 31.

An example of the AVF_INFO data is shown on the left side of FIG. 15 and an example of the data of the AVCHD folder 31 is shown on the right side of FIG. 15.

First, an example of the configuration of the AVCHD folder 31 and the configuration of the AVF_INFO folder 32 will be described.

If one recording is performed according to the AVCHD standard, a MPL file 251-1 is created in a PLAYLIST folder 71, a CPI file 271-1 is created in a CLIPINF folder 72, and a MTS file 291-1 is created in a STREAM folder 73.

Data of contents are arranged in the MTS file 291-1 recorded in the STREAM folder 73. Information regarding contents such as information necessary for decoding of contents is arranged in the CPI file 271-1 recorded in the CLIPINF folder 72. Titles, chapters and the like of contents are arranged in the MPL file 251-1 in the PLAYLIST folder 71.

Similarly to this, if subsequent recording is performed, a MPL file 251-2, a CPI file 271-2 and a MTS file 291-2 are created in the PLAYLIST folder 71, the CLIPINF folder 72 and the STREAM folder 73, respectively.

A registration destination is changed from the MPL file 251-1 to the MPL file 251-2 in the PLAYLIST folder 71 when a recording mode of a moving image is changed (e.g., when the recording mode is changed from a normal mode to a high image quality mode), when a predetermined number of CPI files 271 and MTS files 291 are created in the MPL file 251, when connecting a personal computer using a USB and writing back data from the personal computer, and the like.

However, since this is not sufficient to allow a user to understand a date of photographing, the data of the AVCHD folder 31 is managed using the AVF_INFO data.

The AVF_INFO data in the example of FIG. 15 includes a virtual AVCHD folder 191, a virtual date folder 211, an entry 231-1 and an entry 231-2.

The virtual date folder 211 is located under the virtual AVCHD folder 191, so that a recording date of the data of the AVCHD folder 31 can be managed.

Photographing information regarding contents is recorded on the entry 231. The photographing information regarding the contents, for example, includes date and time when contents are captured, titles, the number of chapters of the titles, and the like.

Furthermore, it is possible to designate data of contents and the like of the AVCHD folder 31 by designating the entry 231 (231-1, 231-2, . . . ).

For example, as illustrated in FIG. 15, a user selects the entry 231-1 of the virtual date folder 211 dated Jan. 22, 2009 and designates "Title: 1 Chapter: 1".

In such a case, for example, contents, which are specified by the designation and correspond to the MPL file 251-1, the CPI file 271-1 and the MTS file 291-1, are reproduced.

In a similar way, when the user selects the entry 231-2 and designates "Title: 2 Chapter: 1", contents, which are specified by the designation, are reproduced.

Consequently, it is possible to understand the number of recorded titles and the number of contents of titles by analyzing the entry 231 of the AVF_INFO, the MPL file 251 of the PLAYLIST folder 71 and the like. Of course, the number of contents and chapters, and other items may also be analyzed.

If the respective analysis results are collated and the number of titles, the number of contents and the like are matched, it is possible to estimate that the analyzed AVCHD folder 31 is an AVCHD folder according to the standard of the recording media thereof.

In addition, the database can also manage non-AVCHD data. Furthermore, the virtual date folder 211 is located under the virtual AVCHD folder 191, but a virtual folder collecting items other than date may also be located.

Returning to FIG. 14, in step S86, the determination section 171 determines the coincidence of the data collated in step S85.

That is, the determination section 171 determines whether the number of titles of the data of the AVCHD folder 31 recorded under the ROOT folder and the number of contents in each title match with the number of titles of the AVF_INFO data and the number of contents in each title.

When the coincidence of the collated data is observed in step S86, the discrimination section 172 determines that connected recording media is the recording media A11 in step S87. An example in which it is determined that the connected recording media is the recording media A11 in step S87 as a result of collation is illustrated in FIGS. 16A and 16B.

Figure 16A:
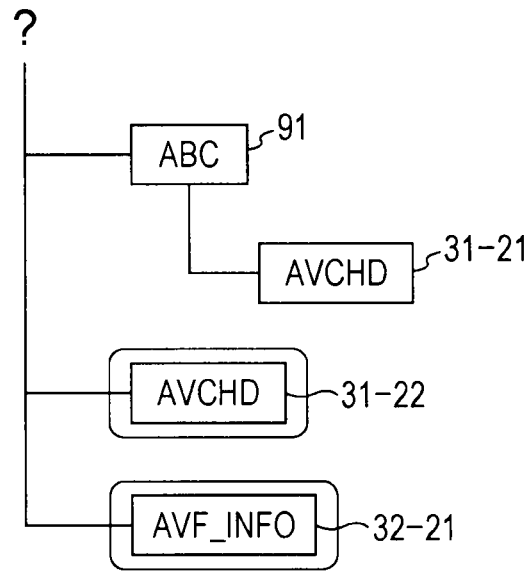
FIGS. 16A and 16B are diagrams illustrating an example in which recording media is discriminated.

FIG. 16A illustrates a state where the types of the recording media are not understood, that is, a state before the process of discriminating the recording media is performed. In the example of FIG. 16A, an AVCHD folder 31-21 is located under the ABC folder 91, and an AVCHD folder 31-22 and an AVF_INFO folder 32-21 ARE located under the ROOT.

When the analysis result of the data of the AVCHD folder 31-22 matches with the database of the AVF_INFO folder 32-21, that is, the analysis result of the AVF_INFO data, the AVCHD folder 31 according to the standard of the recording media is estimated as the AVCHD folder 31-22.

Figure 16B:
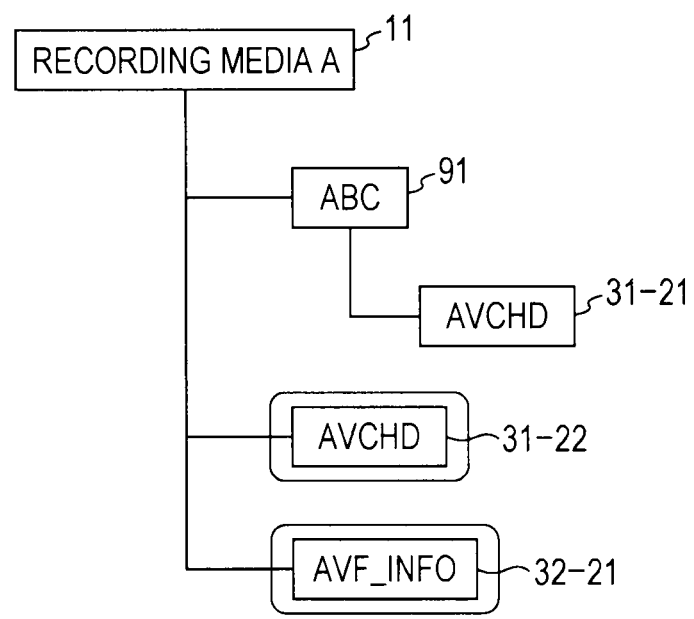

In such a case, as illustrated in FIG. 16B, it is determined that the connected recording media is the recording media A11.

Meanwhile, when the coincidence of the collated data is not observed in step S86 of FIG. 14, the analysis section 175 analyzes the data of the AVCHD folder 31 recorded under the ABC folder 91 in step S88.

In step S89, the collation section 176 collates the analysis result of the AVF_INFO data analyzed in step S83 and the analysis result of the data of the AVCHD folder 31 recorded under the ABC folder 91, which has been analyzed in step S88.

In step S90, the determination section 171 determines whether the coincidence of the collated data collated in step S89 is observed.

That is, the determination section 171 determines whether the number of titles of the data of the AVCHD folder 31 recorded under the ABC folder 91 and the number of contents in each title match with the number of titles of the AVF_INFO data and the number of contents in each title.

When the coincidence of the collated data is observed in step S90, the discrimination section 172 determines that connected recording media is the recording media B12 in step S91. An example in which the collated data coincides with the standard of the recording media B12 in step S91 is illustrated in FIGS. 17A and 17B.

Figure 17A:
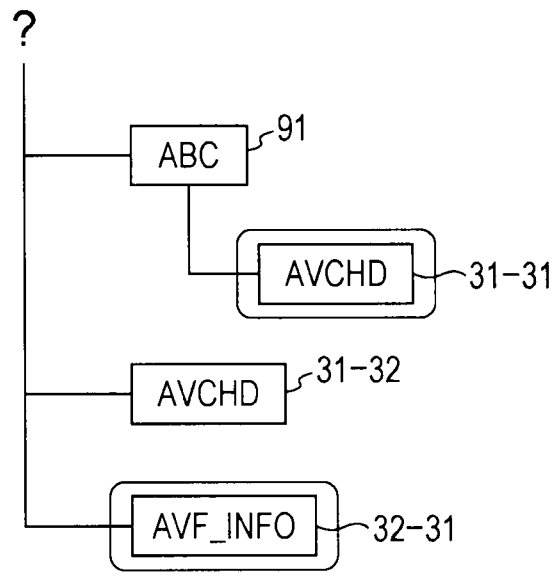
FIGS. 17A and 17B are diagrams illustrating an example in which recording media is discriminated.

FIG. 17A illustrates a state where the types of the recording media are not understood, that is, a state before the process of discriminating the recording media is performed. In the example of FIG. 17A, an AVCHD folder 31-31 is located under the ABC folder 91, and an AVCHD folder 31-32 and an AVF_INFO folder 32-31 ARE located under the ROOT.

When the analysis result of the data of the AVCHD folder 31-31 matches with the database of the AVF_INFO folder 32-31, that is, the analysis result of the AVF_INFO data, the AVCHD folder 31 according to the standard of the recording media is estimated as the AVCHD folder 31-31.

Figure 17B:
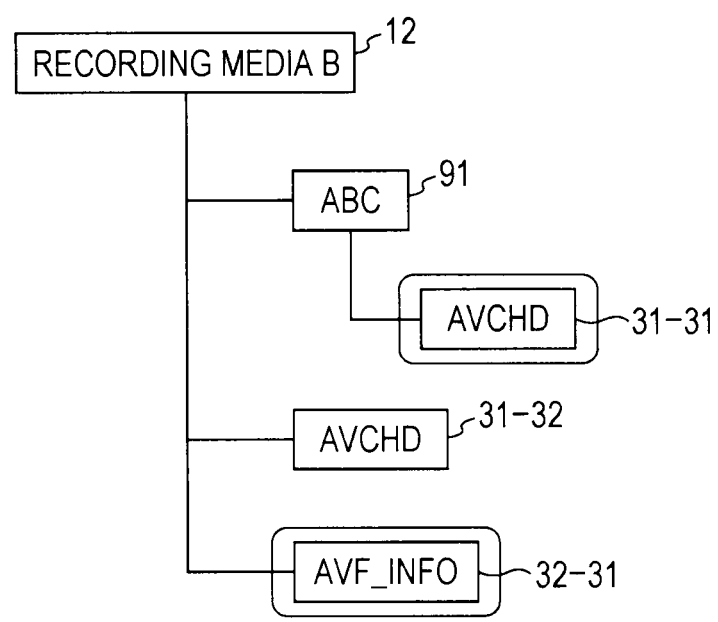

In such a case, as illustrated in FIG. 17B, it is determined that the connected recording media is the recording media B12.

When the coincidence of the collated data is not observed in step S90 of FIG. 14, the discrimination section 172 determines that recording media discrimination is not possible because it is not possible to discriminate the recording media using the AVF_INFO folder 32 in step S92.

Furthermore, when it is determined that the AVCHD folder 31 does not exist under the ROOT folder and the ABC folder 91 in step S82, the discrimination section 172 determines that recording media discrimination is not possible because it is not possible to discriminate the recording media using the AVF_INFO folder 32 in step S93.

After the processes of step S87 and steps S91 to S93, if the recording media discrimination process using the AVF_INFO data is completed, the process returns to step S32 of FIG. 11.

In step S32, the determination section 171 determines whether it is possible to discriminate the recording media through the recording media discrimination process using the AVF_INFO data of step S31.

When it is determined that it is not possible to discriminate the recording media in step S32, that is, when it is determined that the discrimination is not possible in step S92 or S93 of FIG. 14, a recording media discrimination process based on position is performed in step S33. Details of the recording media discrimination process based on position are illustrated in FIG. 18.

Recording Media Discrimination Process Based on Position

Figure 18:
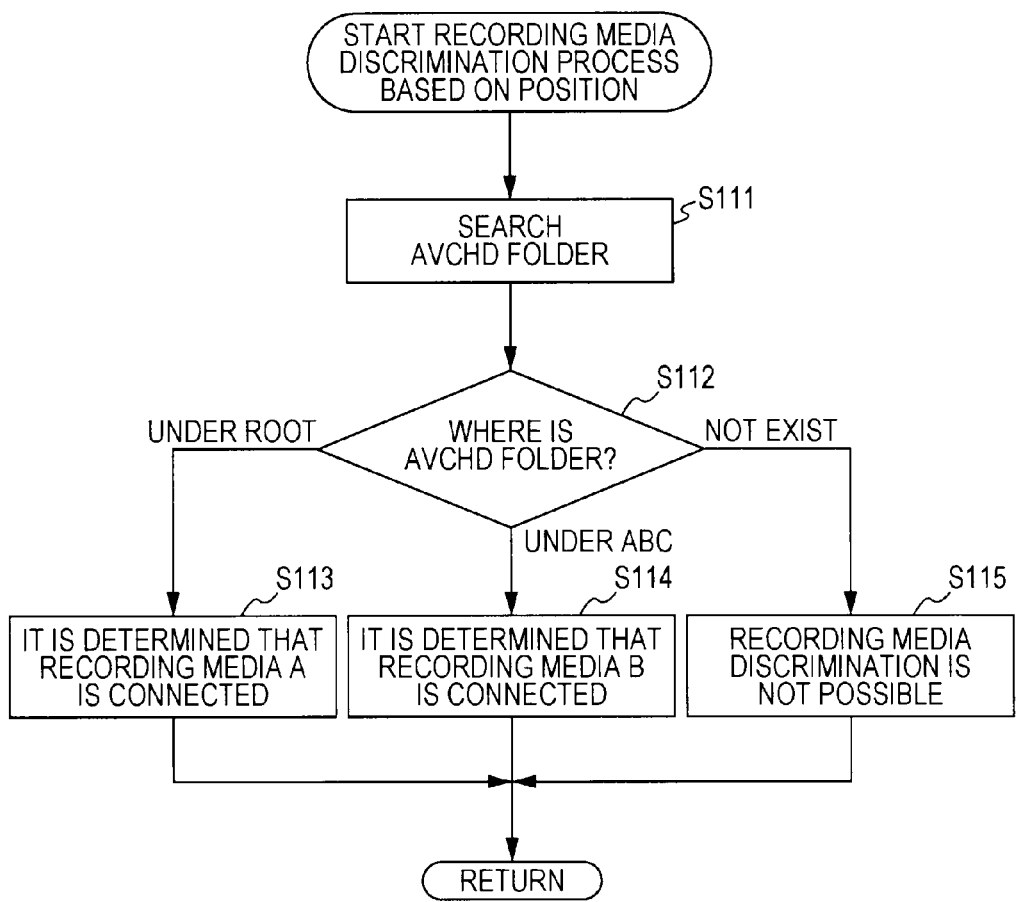
FIG. 18 is a flowchart explaining a recording media discrimination process based on position.

FIG. 18 is a flowchart explaining details of the recording media discrimination process based on position.

In step S111, the search section 174 searches for the AVCHD folder 31 of the recording media. That is, a folder under which the AVCHD folder 31 is recorded is searched for.

In addition, when the AVCHD folder 31 has been already searched for in step S81 of FIG. 14, the process of step S111 is not performed and step S112 is performed.

In step S112, the determination section 171 determines the position of the AVCHD folder 31.

When it is determined that the AVCHD folder 31 is recorded under the ROOT folder in step S112, the discrimination section 172 determines that connected recording media is the recording media A11 in step S113.

When it is determined that the AVCHD folder 31 is recorded under the ABC folder 91 in step S112, the discrimination section 172 determines that the connected recording media is the recording media B12 in step S114.

When it is determined that the AVCHD folder 31 is not recorded in step S112, the discrimination section 172 determines that the recording media discrimination is not possible in step S115.

After the processes of step S113 to S115, if the recording media discrimination process is completed, the process returns to step S34 of FIG. 11.

In step S34, the determination section 171 determines whether it is possible to discriminate the recording media through the recording media discrimination process based on position of step S33.

When it is determined that it is not possible to discriminate the recording media in step S34, that is, when it is determined that the discrimination is not possible in step S115 of FIG. 18, a recording media discrimination process using an identification file is performed in step S35. The identification file is uniquely recorded on recording media. An example of the identification file is illustrated in FIGS. 19A and 19B.

Identification File

Figure 19A:
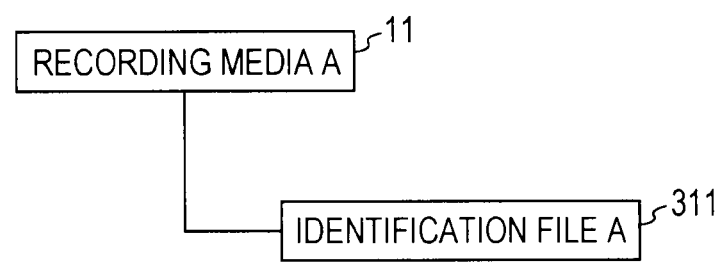
FIGS. 19A and 19B are diagrams illustrating the outline of an identification file.

FIG. 19A is a diagram illustrating an example of an identification file of the recording media A11. An identification file A311 is recorded under the ROOT folder of the recording media A11.

Figure 19B:
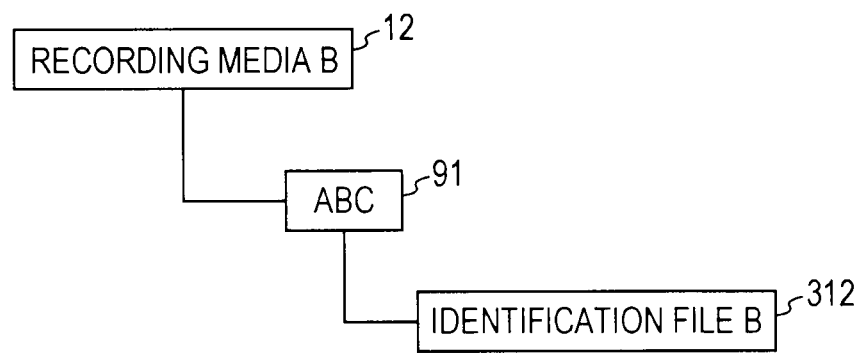

FIG. 19B is a diagram illustrating an example of an identification file of the recording media B12. The ABC folder 91 is located under the recording media B12 and an identification file B312 is recorded under the ABC folder 91. In addition, for example, a DEF folder may be created under the ABC folder 91 and an identification file may be recorded under the DEF folder. That is, the recording position of the identification file is not limited to under the ROOT folder and under the ABC folder 91.

As described above, since the recording media A11 and the recording media B12 have the unique identification files A311 and B312 for each recording media, it is possible to discriminate recording media by searching for the identification file.

However, since the process of discriminating the recording media by using the identification file discriminates the recording media only by the presence or absence of the identification file, if all data of the recording media is copied, the identification file is also copied. Therefore, the reliability of the recording media discrimination process using the identification file is reduced.

In this regard, only when the identification file exists solely, recording media is discriminated using the identification file. Details of a recording media discrimination process using an identification file are illustrated in FIG. 20.

Recording Media Discrimination Process Using Identification File

Figure 20:
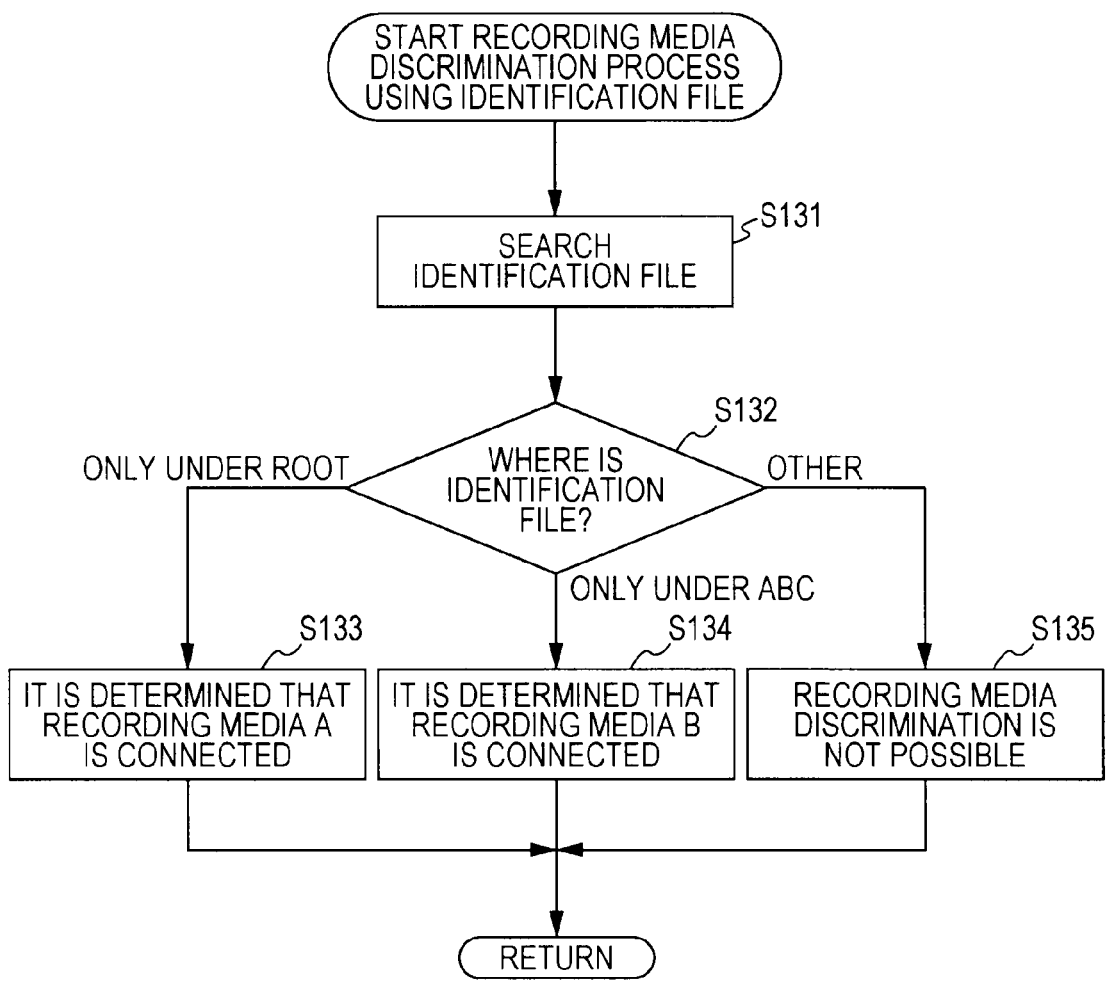
FIG. 20 is a flowchart explaining a recording media discrimination process using an identification file.

FIG. 20 is a flowchart explaining details of the recording media discrimination process using an identification file.

In step S131, the search unit 174 searches for an identification file of recording media. That is, a folder under which the identification file is recorded, is searched for.

In step S132, the determination section 171 determines the position of the identification file.

When it is determined that the identification file is recorded only under the ROOT folder in step S132, that is, when the identification file is recorded only at the position (under the ROOT folder) of the identification file A311 as illustrated in FIG. 19A, the discrimination section 172 determines that connected recording media is the recording media A11 in step S133.

When it is determined that the identification file is recorded only under the ABC folder 91 in step S132, that is, when the identification file is recorded only at the position (under the ABC folder 91) of the identification file B312 as illustrated in FIG. 19B, the discrimination section 172 determines that connected recording media is the recording media B12 in step S134.

When it is determined that the identification file is not recorded only under the ROOT folder or the ABC folder 91 in step S132, that is, when the identification file does not exist or the identification file is recorded under both the ROOT folder and the ABC folder 91, the discrimination section 172 determines that recording media discrimination is not possible in step S135.

After the processes of steps S133 to S135, if the recording media discrimination process using the identification file is completed, the process returns to step S36 of FIG. 11.

In step S36, the determination section 171 determines whether it is possible to discriminate the recording media through the recording media discrimination process using the identification file of step S35.

When it is determined that it is not possible to discriminate the recording media in step S36, that is, when it is determined that the discrimination is not possible in step S135 of FIG. 20, the discrimination section 172 determines that connected recording media is predetermined recording media, e.g., the recording media A11 in step S37.

In addition, in an example of step S37, a process of hardcording recording media is performed. However, it may be regarded as an error and recording, reproduction and the like may not be performed.

After the processes of steps S23, S24, S28 and S29 of FIG. 10, if it is determined that recording media discrimination is possible in steps S32, S34 and S36 of FIG. 11 or the process of step S37 is performed, the recording media discrimination process of FIG. 10 is completed. Thus, the process proceeds to step S2 of FIG. 9.

As described above, the digital video camera 101 can perform a process by specifying recording media even when the types of connected recording media are not obvious.

Folder Configuration Restoration Process

Figure 21:
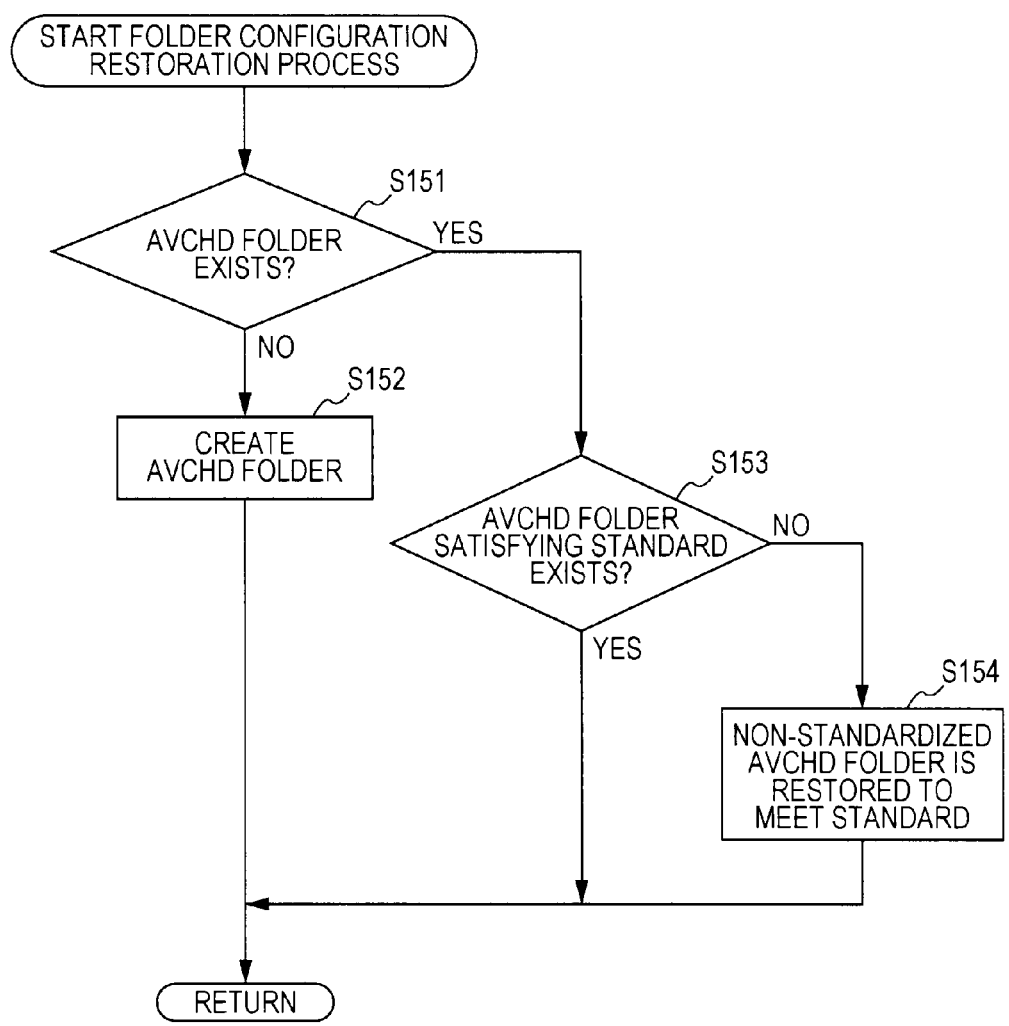
FIG. 21 is a flowchart explaining a folder configuration restoration process.

FIG. 21 is a flowchart explaining details of the folder configuration restoration process of step S2 of FIG. 9.

In step S151, the determination section 171 determines whether the AVCHD folder 31 exists in recording media.

When it is determined that the AVCHD folder 31 does not exist in step S151, the creating section 177 creates the AVCHD folder 31 according to the standard of the recording media in step S152. An example in which the AVCHD folder 31 is created according to the standard of the recording media is illustrated in FIGS. 22A and 22B.

Figure 22A:
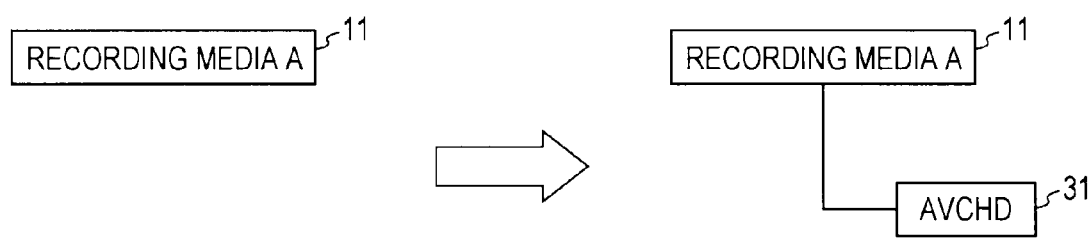
FIGS. 22A and 22B are diagrams illustrating an example of a restoration process.

FIG. 22A is a diagram illustrating an example in which the AVCHD folder 31 is created in the recording media A11. According to the standard of the recording media A11, the AVCHD folder 31 is created under the ROOT folder, that is, under the recording media A11.

Figure 22B:
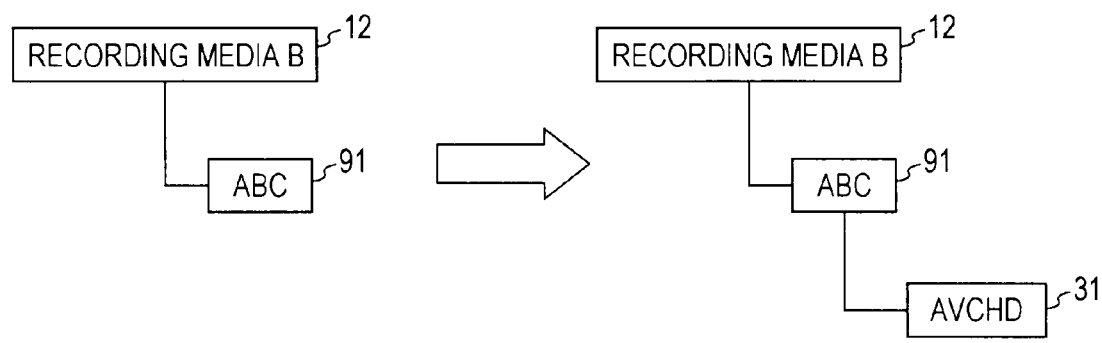

FIG. 22B is a diagram illustrating an example in which the AVCHD folder 31 is created in the recording media B12. According to the standard of the recording media B12, the AVCHD folder 31 is created under the ABC folder 91.

In addition, when the ABC folder 91 does not exist under the recording media B12, the ABC folder 91 is created according to the standard of the recording media B12.

Furthermore, even in the case of other recording media, which is different from the example of FIGS. 22A and 22B, the AVCHD folder 31 can be created according to the standard of the other recording media.

As described above, since the AVCHD folder 31 is created according to the standard of recording media, recorded AVCHD data does not violate the standards of respective recording media, so that the AVCHD data can be accurately processed.

Returning to FIG. 21, when it is determined that the AVCHD folder 31 exists in step S151, the determination section 171 determines whether only the AVCHD folder 31 satisfying the standard exists in step S153. That is, the determination section 171 determines whether a non-standardized AVCHD folder 31 exists.

When it is determined that the non-standardized AVCHD folder 31 exists in the recording media in step S153, the restoration section 178 restores the non-standardized AVCHD folder 31 according to the standard in step S154.

An example in which the non-standardized AVCHD folder 31 is restored according to the standard is illustrated in FIGS. 23 to 26.

Figure 23:
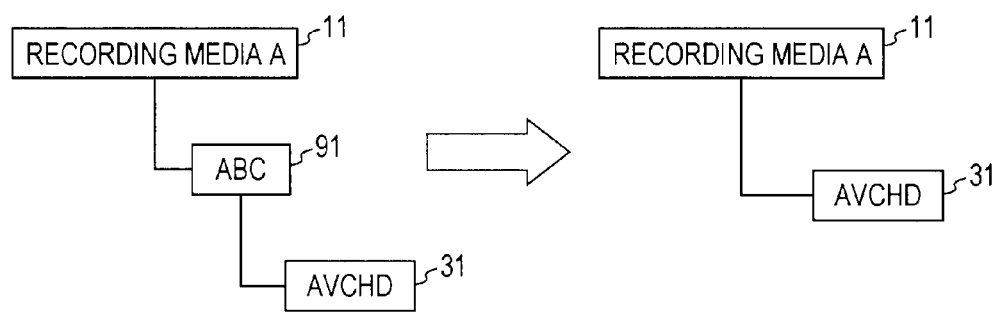
FIG. 23 is a diagram illustrating an example of a restoration process.

FIG. 23 illustrates an example in which the non-standardized AVCHD folder 31 recorded in the recording media A11 is restored. Since the AVCHD folder 31 located at the left side of FIG. 23 is recorded under the ABC folder 91, the AVCHD folder 31 is restored according to the standard of the recording media A11.

That is, the restoration section 178 shifts the AVCHD folder 31 to the ROOT folder, that is, under the recording media A11, as shown in the right side of FIG. 23. Consequently, the AVCHD folder 31 meets the standard of the recording media A11 and can be accurately controlled.

In the example of FIG. 23, the ABC folder 91 is not shown in the recording media A11 after the restoration. However, the ABC folder 91 may be deleted at the time of the restoration or may remain as is.

Figure 24:
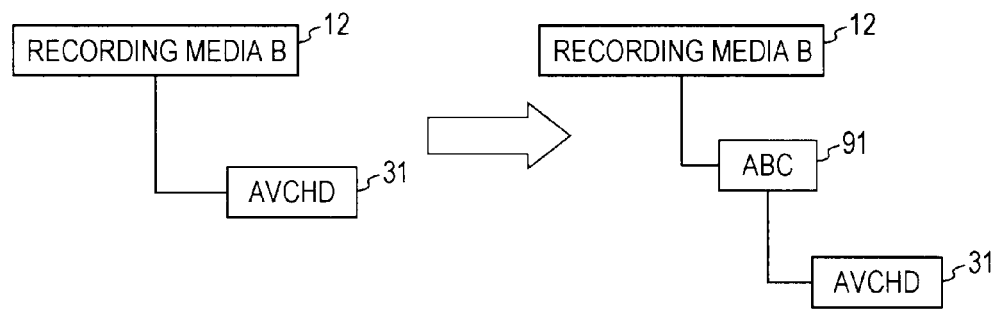
FIG. 24 is a diagram illustrating an example of a restoration process.

FIG. 24 illustrates an example in which the non-standardized AVCHD folder 31 recorded in the recording media B12 is restored. Since the AVCHD folder 31 located at the left side of FIG. 24 is recorded on the ROOT folder, that is, under the recording media B12, the AVCHD folder 31 is restored according to the standard of the recording media B12.

That is, the restoration section 178 shifts the AVCHD folder 31 under the ABC folder 91, as shown in the right side of FIG. 24. Consequently, the AVCHD folder 31 meets the standard of the recording media B12 and can be accurately controlled.

In addition, when the ABC folder 91 does not exist under the recording media B12, the ABC folder 91 is also created.

Figure 25:
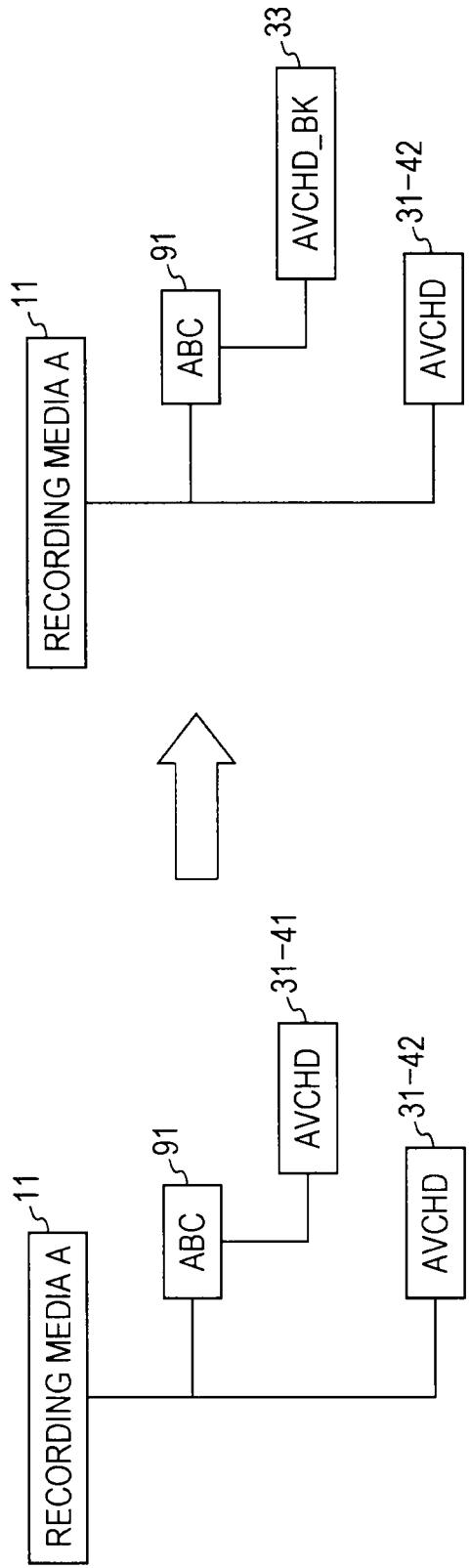
FIG. 25 is a diagram illustrating an example of a restoration process.

As shown in the left side of FIG. 25, the recording media A11 includes an AVCHD folder 31-41, which does not meet the standard of the recording media A11, that is, which is not located under the ROOT folder, and an AVCHD folder 31-42, which meets the standard of the recording media A11, that is, which is located under the ROOT folder.

In such a case, the restoration section 178 changes the folder name of the AVCHD folder 31-41, which does not meet the standard of the recording media A11, from 'AVCHD' to 'AVCHD_BK' as shown in the right side of FIG. 25. Since an AVCHD_BK folder 33 is a file different from the AVCHD folder 31, the AVCHD folder 31-42 recorded on the recording media A11 can be accurately controlled.

A non-standardized folder is not deleted and the folder name thereof is changed, so that individual data recorded in the AVCHD folder 31-41 can be preserved without being deleted. As a result, it is possible to read the data of the AVCHD_BK folder 33 through a personal computer and the like.

In addition, although the folder name is changed to 'AVCHD_BK', there is no limitation when changing the folder name if the AVCHD folder 31-41 is not read as the AVCHD folder 31.

As shown in the left side of FIG. 26, the recording media B12 includes an AVCHD folder 31-51, which meets the standard of the recording media B12, that is, which is located under the ABC folder 91, and an AVCHD folder 31-52, which does not meet the standard of the recording media B12, that is, which is located under the ROOT folder.

In such a case, the restoration section 178 changes the folder name of the AVCHD folder 31-52, which does not meet the standard of the recording media B12, from 'AVCHD' to 'AVCHD_BK' as shown in the right side of FIG. 26. Consequently, the AVCHD folder 31-51 recorded on the recording media B12 can be accurately controlled.

As descried above, the digital video camera 101 automatically restores the non-standardized AVCHD folder 31, thereby accurately controlling the non-standardized AVCHD folder 31.

In addition, in the specification, two types of folder configurations are written. However, a folder configuration is not limited thereto.

Configuration of Computer

FIG. 27 is a block diagram illustrating an example of the configuration of software of a computer that performs a series of processes as described above through a program.

In a computer 400, a CPU 421, a ROM (Read Only Memory) 422 and a RAM (Random Access Memory) 423 are connected to one another through a bus 424. In addition, an input/output interface 425 is connected to the bus 424. An input unit 426 including a keyboard, a mouse, a microphone and the like, an output unit 427 including an output device, a speaker and the like, and a storage unit 428 including a hard disk, a non-volatile memory and the like are connected to the input/output interface 425. Moreover, a communication unit 429 including a network interface and the like, and a drive 430 for driving a removable media 431 such as a magnetic disk, an optical disc, a magneto-optical disk or a semiconductor memory are connected to the input/output interface 425.

In the computer configured as described above, the CPU 421 executes a program, for example, stored in the storage unit 428 by loading the program to the RAM 423 through the input/output interface 425 and the bus 424, and the series of processes as described above are performed. The program executed by the computer 400 (the CPU 421), for example, is provided after being recorded on the removable media 431, which is a magnetic disk (includes a flexible disk). The program is stored in a removable media 431 which is a package media. In addition, as package media, an optical disk (CD-ROM (Compact Disc-Read Only Memory), DVD (Digital Versatile Disc) and the like), a magneto-optical disk, a semiconductor memory and the like are used. Moreover, the program is provided through a wired or wireless transmission medium called a local area network, the Internet and a digital satellite broadcast. Furthermore, the removable media 431 is loaded in the driver 430, so that the program can be installed in the storage unit 428 through the input/output interface 425. In addition, the program can be received in the communication unit 429 through a wired or wireless transmission medium and installed in the storage unit 428. Otherwise, the program can be installed in advance in the ROM 422 or the storage unit 428.

In addition, the program executed by the computer may be executed in chronological order according to the order described in the specification, executed in parallel, or executed at timing when a call is performed.

The present application contains subject matter related to that disclosed in Japanese Priority Patent Application JP 2010-000921 filed in the Japan Patent Office on Jan. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors operable to:
discriminate a type of recording media based on a standard of recording content on the recording media;
search for a predetermined folder with a standard name based on the standard of recording content on the recording media;
determine whether a recording position of the predetermined folder within a hierarchical file system of the recording media is in accordance with the standard of recording associated with the recording media; and restore the predetermined folder based on a determination that the recording position of the predetermined folder within the hierarchical file system of the recording media does not meet the standard of recording, wherein the restoration comprises one or more of: shifting the recording position of the predetermined folder to a different hierarchical level within the hierarchical file system, or changing the standard name of the predetermined folder to a non-standard name based on the standard of recording.

2. The information processing apparatus according to claim 1, wherein the one or more processors are further operable to further comprising:

analyze content in the predetermined folder and database information in a second folder, wherein the search section searches for the second folder; and collate coincident information in the second folder with information in the predetermined folder, wherein the types of the recording media are discriminated based on the coincident information.

3. The information processing apparatus according to claim 1, wherein the one or more processors are operable to discriminate the types of the recording media based on the recording position of the predetermined folder within the file system.

4. The information processing apparatus according to claim 1, wherein the one or more processors are operable to:

search for a unique identification file of the recording media, determine a recording position of the identification file, and discriminate the types of the recording media based on the recording position of the unique identification file.

5. The information processing apparatus according to claim 1, wherein the one or more processors are operable to discriminate the recording media as a predefined recording media when it is not possible to discriminate the types of the recording media.

6. An information processing method comprising:

in an information processing apparatus:

discriminating a type of recording media based on a standard of recording content on the recording media;

searching for a predetermined folder with a standard name based on the standard of recording content on the recording media;

determining whether a recording position of the predetermined folder within a hierarchical file system of the recording media is in accordance with the standard of recording associated with the recording media; and restore the predetermined folder based on a determination that the recording position of the predetermined folder within the hierarchical file system of the recording media does not meet the standard of recording, wherein the restoration comprises one or more of: shifting the recording position of the predetermined folder to a different hierarchical level within the hierarchical file system, or changing the standard name of the predetermined folder to a non-standard name based on the standard of recording.

7. An non-transitory computer-readable storage medium having stored thereon, a computer program having at least one code section for communication, the at least one code section being executable by a computer for causing the computer to perform steps comprising:

discriminating a type of recording media based on a standard of recording content on the recording media;

searching for a predetermined folder with a standard name based on the standard of recording content on the recording media;

determining whether a recording position of the predetermined folder within a hierarchical file system of the recording media is in accordance with the standard of recording associated with the recording media; and restore the predetermined folder based on a determination that the recording position of the predetermined folder within the hierarchical file system of the recording media does not meet the standard of recording, wherein the restoration comprises one or more of: shifting the recording position of the predetermined folder to a different hierarchical level within the hierarchical file system, or changing the standard name of the predetermined folder to a non-standard name based on the standard of recording.

8. The information processing apparatus according to claim 1, wherein the one or more processors are operable to discriminate the type of the recording media using an identification file.

9. The information processing apparatus according to claim 1, wherein the one or more processors are further operable to analyze content in the predetermined folder and database information in a second folder, wherein the one or more processors are further operable to search for the second folder.

10. The information processing method according to claim 6, wherein the restoration is performed when the recording media is connected to the information processing apparatus.

11. The information processing method according to claim 6, further comprising:

searching for a unique identification file of the recording media, determining a recording position of the unique identification file, and discriminating the types of the recording media based on the recording position of the unique identification file.

12. The information processing method according to claim 6, wherein the discriminating the type of recording media comprises discriminating the recording media as a predefined recording media.

13. The information processing method according to claim 6, further comprising discriminating the type of the recording media using an identification file.

14. The non-transitory computer-readable storage medium according to claim 7, wherein the restoration is performed when the recording media is connected to an information processing apparatus.

* * * * *